US009177269B2

(12) United States Patent
Diao et al.

(10) Patent No.: US 9,177,269 B2
(45) Date of Patent: Nov. 3, 2015

(54) COMPLEXITY REDUCTION OF USER TASKS

(75) Inventors: Yixin Diao, White Plains, NY (US); Richard Sobiesiak, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 1222 days.

(21) Appl. No.: 12/475,035

(22) Filed: May 29, 2009

(65) Prior Publication Data
US 2010/0305991 A1   Dec. 2, 2010

(51) Int. Cl.
*G06Q 10/00*   (2012.01)
*G06Q 10/04*   (2012.01)
*G06Q 10/10*   (2012.01)

(52) U.S. Cl.
CPC ............ *G06Q 10/04* (2013.01); *G06Q 10/1097* (2013.01)

(58) Field of Classification Search
CPC ....................................................... G06Q 10/00
USPC ......................................................... 705/7.14
See application file for complete search history.

(56) References Cited

U.S. PATENT DOCUMENTS

| | | | |
|---|---|---|---|
| 5,745,880 A | 4/1998 | Strothmann | |
| 5,765,138 A | 6/1998 | Aycock et al. | |
| 5,793,632 A | 8/1998 | Fad et al. | |
| 5,907,488 A | 5/1999 | Arimoto et al. | |
| 5,960,417 A | 9/1999 | Pan et al. | |
| 6,263,020 B1 | 7/2001 | Gardos et al. | |
| 6,438,594 B1 | 8/2002 | Bowman-Amuah | |
| 6,453,269 B1 | 9/2002 | Quernemoen | |
| 6,467,080 B1 | 10/2002 | Devine et al. | |
| 6,526,387 B1 | 2/2003 | Ruffin et al. | |
| 6,526,392 B1 | 2/2003 | Dietrich et al. | |
| 6,651,244 B1 | 11/2003 | Smith et al. | |
| 6,675,149 B1 | 1/2004 | Ruffin et al. | |
| 6,681,230 B1 | 1/2004 | Blott et al. | |
| 6,715,130 B1 | 3/2004 | Eiche et al. | |
| 6,922,684 B1 | 7/2005 | Aldridge et al. | |
| 6,970,803 B1 | 11/2005 | Aerdts et al. | |
| 7,039,606 B2 | 5/2006 | Hoffman et al. | |
| 7,177,774 B1 | 2/2007 | Brown et al. | |
| 7,728,870 B2 * | 6/2010 | Rudnik et al. | ............. 348/143 |
| 7,904,320 B1 | 3/2011 | Adams et al. | |
| 8,200,527 B1 * | 6/2012 | Thompson et al. | .......... 705/7.39 |

(Continued)

OTHER PUBLICATIONS

Diao et al. (Diao), "Quantifying the complexity of IT service management processes", R. State et al. IEds.): DSOM 2006, LNCS 4269, pp. 61-73, 2006.*

(Continued)

*Primary Examiner* — Thomas Mansfield
(74) *Attorney, Agent, or Firm* — Louis J. Percello; Ryan, Mason & Lewis, LLP

(57) ABSTRACT

An exemplary method for reducing complexity of at least one user task includes steps of calculating a complexity metric for the at least one user task; identifying one or more usability issues having a measurable impact on the complexity metric for the at least one user task; determining one or more recommendations for addressing at least one of the one or more usability issues; and displaying a representation of at least one of the one or more usability issues and of at least one of the one or more recommendations. In an illustrative embodiment, implementing any one of the one or more recommendations reduces the impact of the usability issue on the complexity metric of the at least one user task and thereby reduces a complexity of the at least one user task.

15 Claims, 27 Drawing Sheets

(56) References Cited

U.S. PATENT DOCUMENTS

| | | | |
|---|---|---|---|
| 2002/0143606 A1 | 10/2002 | Atefi et al. | |
| 2002/0169649 A1 | 11/2002 | Lineberry et al. | |
| 2003/0088456 A1 | 5/2003 | Ernest et al. | |
| 2003/0187719 A1 | 10/2003 | Brocklebank | |
| 2004/0024627 A1 | 2/2004 | Keener | |
| 2004/0068431 A1 | 4/2004 | Smith et al. | |
| 2004/0186757 A1 | 9/2004 | Starkey | |
| 2004/0186817 A1 | 9/2004 | Thames et al. | |
| 2004/0199417 A1 | 10/2004 | Baxter et al. | |
| 2004/0236805 A1 | 11/2004 | Gordon | |
| 2005/0137950 A1* | 6/2005 | Palozzi et al. | 705/35 |
| 2005/0203917 A1 | 9/2005 | Freeberg et al. | |
| 2006/0069607 A1 | 3/2006 | Linder | |
| 2007/0038465 A1 | 2/2007 | Jang et al. | |
| 2007/0043524 A1 | 2/2007 | Brown et al. | |
| 2007/0043525 A1 | 2/2007 | Brown et al. | |
| 2007/0136016 A1 | 6/2007 | Brown et al. | |
| 2007/0240131 A1* | 10/2007 | Sumerlin, Jr. | 717/139 |
| 2007/0282644 A1 | 12/2007 | Diao et al. | |
| 2007/0282645 A1* | 12/2007 | Brown et al. | 705/7 |
| 2007/0282876 A1 | 12/2007 | Diao et al. | |
| 2008/0215404 A1 | 9/2008 | Diao et al. | |
| 2009/0033807 A1* | 2/2009 | Sheng et al. | 348/734 |
| 2009/0254492 A1* | 10/2009 | Diao et al. | 705/400 |

OTHER PUBLICATIONS

H.W. Desurvire, "Faster, Cheaper!! Are Usability Inspection Methods as Effective as Empirical Testing?", Usability Inspection Methods, J. Nielsen & R.L. Mack (eds.), 1994, pp. 173-202, John Wiley & Sons, Inc., New York, NY, USA, available at http://www.behavioristics.com/downloads/usabilityinspectionmethods.pdf.

P. McInerney & F. Maurer, "UCD in Agile Projects: Dream Team or Odd Couple?", Interactions, Nov.-Dec. 2005, pp. 19-23, vol. 12, No. 6, ACM, New York, NY, USA.

J. Nielsen, "Guerilla HCI: Using Discount Usability Engineering to Penetrate the Intimidation Barrier", Cost-Justifying Usability, R.G. Bias & D.J. Mayhew (eds.), 1994, pp. 242-272, Academic Press, Inc., Orlando, FL, USA, available at http://www.useit.com/papers/guerilla-hci.html.

C. Tian et al., "Business Value Analysis of IT Services", Proceedings of the IEEE International Conference on Services Computing (SCC 2007), Jul. 2007, pp. 308-315, Salt Lake City, Utah, USA.

A.B. Brown et al., "Experience with Evaluating Human-Assisted Recovery Processes," Proceedings of the IEEE International Conference on Dependable Systems and Networks, Jun.-Jul. 2004, pp. 405-410, IEEE Computer Society, Washington, DC, USA.

A.B. Brown et al., "A Model of Configuration Complexity and its Application to a Change Management System," Proceedings of the 9th Annual IFIP/IEEE International Conference on Integrated Network Management (IM 2005), May 2005, pp. 631-644.

A. Schroeder, "Integrated Program Measurement and Documentation Tools," Proceedings of the 7th International Conference on Software Engineering, 1984, pp. 304-313, IEEE Press, Piscataway, NJ, USA.

U.S. Appl. No. 12/062,853, filed in the name of Y. Diao et al. on Apr. 4, 2008 and entitled "Method and Apparatus for Estimating Value of Information Technology Service Management Based on Process Complexity Analysis."

K. Beck et al., "Manifesto for Agile Software Development", 2001, http://agilemanifesto.org.

K. Beck et al., "Principles behind the Agile Manifesto", 2001, http://agilemanifesto.org/principles.html.

* cited by examiner

FIG. 6

| RATING | SUMMARY OF REQUIREMENTS | EXAMPLE |
|---|---|---|
| Level 1 (well-constrained user interface navigation) | *User interface guides user into and through the step<br>*No need for user to rely on documentation for navigating into and through this step other than embedded user assistance.<br>*Well-constrained set of navigational choices | A wizard where the user proceeds into the step through selection of the "Next" button and then completes the step by entering values in a set of input fields on the wizard page. In other words, the step maps directly into completion of a page in the wizard. |
| Level 2 (basic user interface navigation) | *User interface guides user into and through the step<br>*No need for user to rely on documentation for navigating into and through this step other than embedded user assistance.<br>*User has several choices to make in navigating into and through the step (i.e., it is not a well-constrained set of navigational choices, as in the case of Level 1 above). | In Internet Explorer: changing the color of web page links requires selection of "Tools/Internet Options…" and then selection of the "Colors" pushbutton and completion of a dialog. |
| Level 3 (navigation supported by complete task-oriented documentation) | *Complete task-oriented documentation guides the user into and through this step<br>*Documentation for this step is no more than one link away from mainline documentation for overall task<br>*Documentation is clear and complete. | A step that is fully documented in a procedural description of the overall user task in online documentation. |
| Level 4 (navigation supported by basic documentation) | *Some level of documentation provided for navigating into/through the step<br>*Documentation for this task requires significant searching/following of links, or it is lacking in clarity or completeness. | Documentation for navigating into and through the step is spread across different documents and is not linked together. Users need to search for the relevant documentation and piece it together themselves. |
| Level 5 (unsupported navigation) | *No user interface or documentation support for enabling users to complete the navigation on their own<br>*User will need to seek support of others (e.g., community support, official support channels) or rely on experimentation. | Missing or incorrect documentation on how to navigate into and through the step. |

FIG. 7

| METRIC | LEVEL DEFINITIONS | EXAMPLE |
|---|---|---|
| Context shifts (one rating for each context shift encountered by the user in this step) | Level 1 (intra-tool): *User stays in current workspace or moves from one workspace to another workspace within the same UI platform. | A step involves navigating from the primary window of a graphical user interface to a dialog box spawned by the primary window. |
| | Level 2 (inter-tool): *User moves from one workspace to another workspace in a different UI platform but within the same product. | The user jumps from a DB2 GUI tool (e.g., Data Studio) to the DB2 command line (i.e., the CLP). |
| | Level 3 (cross-product): *User moves across product workspaces | Moving between a DB2 and a non-DB2 workspace, as in the case of tasks that take the user from DB2 to other products such as WAS or AIX. |

FIG. 8

| METRIC | LEVEL DEFINITIONS |
|---|---|
| New concepts (one rating per step for the most complex new concept in the step) | Level 0 (no new concepts):<br>*No new concepts introduced in this step for the targeted user role.<br>*All concepts that need to be understood for this step were introduced in a preceding step.<br><br>Level 1 (common concepts):<br>*All new concepts introduced in this step are common concepts for the targeted user role (i.e., common with other products used by the targeted user role).<br><br>Level 2 (simple documentation reference):<br>*At least one new concept introduced in this step is not a common concept for the targeted user role.<br>*All of these "uncommon concepts" are explained in one module of product documentation.<br>*All the uncommon concepts are explicitly called out in the user interface or product documentation.<br>*Any prerequisite concepts needed to understand uncommon concepts introduced in this step are common concepts and are explicitly called out in the user interface or product documentation.<br><br>Level 3 (complex documentation reference):<br>*At least one new concept introduced in this step is not a common concept.<br>*The uncommon concepts are explained in product documentation but requires a complex documentation reference -- does not meet the requirements of Level 2 above.<br><br>Level 4 (undocumented concept):<br>*At least one new uncommon concept is not explained well enough in the product documentation for users to complete this step. Users will need to rely on sources other than product documentation (e.g., community support, official technical support channels for the product). |

FIG. 8 cont.

| EXAMPLE |
|---|
| Step 1 consists of creating a new workload, as does step 9 of the same task. Therefore, step 9 does not introduce any new concepts since step 1 has introduced any new concepts required for creating a new workload. |
| Common concepts for database administrators: tables, views, indexes, concurrency, backups. Common UI concepts for eclipse: project, perspective. |
| For the concept "understanding the difference between circular and archive logging" it would be sufficient to read one article in the DB2 Information Center. |
| Understanding how to improve the load performance for MDC in DB2. This concept requires an understanding of prerequisite concepts such as utility heap size and these prerequisites are not common concepts. |
| A product includes a "hidden" feature that is not explained in product documentation. Any step that introduces uncommon concepts associated with this hidden feature receives a Level 4 new concept rating. |

FIG. 9

| METRIC | LEVEL DEFINITIONS |
|---|---|
| Input parameters (one rating for each input parameter that needs to be entered by the user in each step) | Level 0 (re-used parameter):<br>*The input parameter value was either:<br>*Produced by the system in an earlier step of the task flow, or<br>*Entered by the user in an earlier step of the task flow.<br>*The parameter's description in the user interface or documentation for this step is the same as that of a parameter used in a previous step.<br><br>Level 1 (free-choice parameter):<br>*The parameter value can be chosen freely subject to commonly-understood constraints that do not require the expertise of a user experienced with this product.<br><br>Level 2 (documentation-direct parameter):<br>*The parameter value can be taken directly from the product's documentation with no adaptation required.<br>*Product documentation for this parameter value is in one place that is easily found through search or through scanning the table of contents.<br><br>Level 3 (documentation-adapted parameter) applies to two situations:<br>*The parameter value can be based on product documentation but requires adaptation/customization for this step.<br>*The user needs to draw on their own recollection or records for the parameter value.<br><br>Level 4 (expertise-based parameter):<br>*The parameter value requires the expertise of an experienced user but does not require further investigation of the system.<br><br>Level 5 (environment-fixed parameter):<br>*The parameter value is constrained by the environment to a specific value.<br>*The user needs to either: 1) investigate the system to determine the parameter value or 2) consult with another person to determine the parameter value.<br><br>Level 6 (environment-constrained parameter):<br>*The parameter value is constrained by the environment to a set of non-obvious choices that require specialized expertise and investigation of the system. |

*FIG. 9 cont.*

| EXAMPLE |
|---|
| An installation utility shows that the product was installed in c:\Program Files\xyz and then the user is asked to enter the product's installation directory in a subsequent step. |
| Enter a new password subject to standard password constraints. |
| Product documentation specifies entry of the command:<br>rpm -ivh pkgname.rpm<br>The user enters the command exactly as shown in product documentation to complete this step. |
| A step involves taking the following example from the DB2 Information Center and adapting the database name (which is "mydb" in this example) to apply to the context of the user task:<br>db2 restore db mydb replace existing redirect |
| An experienced DBA would know they want to select archive logging when configuring logging for a database. |
| The user needs to determine the path to a pre-installed executable or the listening port number of a TCP/IP server. |
| A database administrator analyzes monitoring data in order to set a WLM threshold value. In this example there is no single "right" answer -- it requires analysis and experience to determine an appropriate threshold value. |

FIG. 10

| METRIC | LEVEL DEFINITIONS |
|---|---|
| | Level 0: No errors are possible for this step. |
| Error feedback (one rating per step based on the worst-case error condition uncovered for the step) | Level 1 (complete UI-based):<br>1. User interface clearly reports error conditions and provides helpful/complete recommendations on diagnosing and fixing problems in common situations. Furthermore:<br>a. Recommendations are specific to the context of the error condition rather than generalizations.<br>b. The interface presents one particular recommendation rather than presenting a list of possible recommendations that the user needs to investigate.<br>1. Error context in user interface: The user does not have to search for the error in the user interface but, instead, is taken directly to where the error has occurred.<br>2. Automatic on-the-fly feedback: Error feedback is delivered automatically and in an "on-the-fly" manner without requiring the user to explicitly invoke a separate action to invoke the feedback. |
| | Level 2 (basic UI-based):<br>User interface clearly reports error conditions and provides helpful/complete recommendations on diagnosing and fixing problems in common situations. Furthermore, recommendations are specific to the context of the error condition rather than generalizations.<br>(This is the same as 1a under Level 1.) |

*FIG. 10 cont. (a)*

| EXAMPLE |
|---|
| A step consists of completing a wizard page that includes only a radio button group with a default value already selected. The user cannot generate errors regardless of which selection they make. |
| When a step consists of filling out a dialog box to copy a file:<br>1) Any text entry in the dialog box (e.g., specifying target file name) is dynamically parsed to validate that the file name syntax is valid.<br>2) Error feedback such as "invalid file name" is delivered where the error has occurred (e.g., next to the text box for the target file name).<br>3) If an error occurs after the dialog box is filled in and OK is pressed (e.g., "insufficient space to create a copy of the file") then the feedback includes a specific recommendation on how to resolve the problem (e.g., "delete unnecessary files and then retry the operation"). |
| An error message consisting of only "The bind file name is not valid" is too general for Level 1. A specific feedback message suitable for Level 1 would provide the name of the bind file name, the name of the associated package, and an explanation for why the bind file name is not valid (e.g., too long, invalid characters). |

FIG. 10 cont. (b)

Level 3 (complete documentation-based):
1. User interface reports error conditions but does not provide helpful and complete recommendations for diagnosing and fixing the problems.
2. Product documentation provides clear, complete, easily found, and helpful information on diagnosing and fixing the problem based on the error conditions reported in the user interface. Furthermore, the user finds all the information required to diagnose and fix the problem in one place in the product documentation and does not need to search through documentation for other products.

Level 4 (basic documentation-based):
1. User interface reports error conditions but does not provide helpful and complete recommendations for diagnosing and fixing the problems. (This is the same as the first requirement under Level 3.)
2. Product documentation is sufficient to diagnose and fix the problem based on the error conditions reported in the user interface. However, the documentation is not located in one place or is not clear, complete, and easily found.

Level 5 (inadequate):
*No effective user interface support and product documentation support for diagnosing and fixing problems.

FIG. 10 cont. (c)

| A command returns an error code and a brief message that is not sufficient to solve the problem. The user then enters a command that invokes extended help on the error code and the resulting online message text provides helpful information for diagnosing and fixing the problem all conveniently located in one place. | The user needs to search through several articles in product documentation and then piece together the information to resolve the problem. | User has to resort to newsgroups, a support call, or other such means to resolve problems. |
|---|---|---|

FIG. 11

| METRIC | LEVEL DEFINITIONS |
|---|---|
| System feedback (one rating per step for the most complex system feedback in the step) | Level 0: applies only to planning steps. All planning steps are assigned Level 0 system feedback. |
| | Level 1 (easily-consumed feedback):<br>*System provides: 1) feedback confirming user actions; 2) progress information (if the operation takes more than one second). Progress information does not stay in any one state for longer than 20% of total time.<br>*System feedback has low information clutter with no extraneous information.<br>*System returns low volume of information -- everything can be displayed without scrolling in a maximized command line window or maximized graphical interface (assuming 1024 x 768 resolution).<br>*System feedback is delivered automatically and in the same workspace where the user invoked the operation. |
| | Level 2 (manageable feedback):<br>*System provides: 1) feedback confirming user actions; 2) progress information (if the operation takes more than one second).<br>*System feedback has low information clutter or the ability to filter away information clutter. |
| | Level 3 (difficult-to-consume feedback) does not meet Level 1 or 2 requirements. |

FIG. 11 cont.

| EXAMPLE |
|---|
| User decides whether to install an administration console on a single machine or in a multi-tier environment. This planning step involves no user actions and therefore no system feedback. |
| Entering the command "quiesce database immediate" produces the system response "The QUIESCE DATABASE command completed successfully" and no other output. |
| The DB2 Activity Monitor produces potentially long reports in tabular GUI widgets that allow sorting on columns such as "Application ID" and "Total CPU time". Therefore, if the objective of a step is to identify the top CPU time consumers for a specific application ID then an Activity Monitor report would satisfy the requirement of filtering away information clutter. |
| Commands that return large volumes of data to the command window and require the user to manually sift through the data to find relevant details for their task. |

FIG. 12

| TASK NAME | RATING | | | | | |
|---|---|---|---|---|---|---|
| | NAVIGATIONAL GUIDANCE | CONTEXT SHIFTS | NEW CONCEPTS | INPUT PARAMETERS | ERROR FEEDBACK | SYSTEM FEEDBACK |
| TURN OFF FIREWALL AND MALWARE PROTECTION | 4 | 2 | 1 | 0 | 3 | 1 |
| EXECUTE THE SETUP FILE DOWNLOADED DURING THE PREVIOUS TASK | 3 | 3 | 1 | 0 | 1 | 1 |
| SELECT OPTION FOR AGREEING WITH THE SOFTWARE LICENSE AGREEMENT | 1 | 1 | 0 | 0 | 0 | 1 |
| SELECT TYPE OF INSTALLATION ("TYPICAL INSTALL" RATHER THAN "CUSTOM INSTALL") | 1 | 1 | 0 | 0 | 0 | 1 |
| SPECIFY INSTALLATION DIRECTORY (ACCEPT THE DEFAULT) | 1 | 1 | 1 | 1 | 1 | 1 |
| SPECIFY USERID AND PASSWORD FOR AUTHENTICATION | 1 | 1 | 0 | 2 | 3 | 2 |
| INSTALL PROGRAM FILES | 1 | 1 | 0 | 0 | 1 | 3 |
| SPECIFY PREFERENCES (ACCEPT THE DEFAULTS) | 1 | 1 | 0 | 0 | 1 | 1 |
| TURN ON FIREWALL AND MALWARE PROTECTION | 4 | 3 | 0 | 0 | 3 | 1 |

FIG. 13

| RATING | COMPLEXITY METRIC |
|---|---|
| LEVEL 1: WELL-CONSTRAINED USER INTERFACE NAVIGATION | 1 |
| LEVEL 2: BASIC USER INTERFACE NAVIGATION | 2 |
| LEVEL 3: NAVIGATION SUPPORTED BY COMPLETE TASK-ORIENTED DOCUMENTATION | 3 |
| LEVEL 4: NAVIGATION SUPPORTED BY BASIC DOCUMENTATION | 6 |
| LEVEL 5: UNSUPPORTED NAVIGATION | 9 |

FIG. 14

| RATING | COMPLEXITY METRIC |
|---|---|
| LEVEL 0: NO FEEDBACK | 0 |
| LEVEL 1: EASILY-CONSUMED FEEDBACK | 1 |
| LEVEL 2: MANAGEABLE FEEDBACK | 3 |
| LEVEL 3: DIFFICULT-TO-CONSUME FEEDBACK | 9 |

FIG. 15

| TASK NAME | COMPLEXITY METRICS | | | | | | |
|---|---|---|---|---|---|---|---|
| | NAVIGATIONAL GUIDANCE | CONTEXT SHIFTS | NEW CONCEPTS | INPUT PARAMETERS | ERROR FEEDBACK | SYSTEM FEEDBACK | TOTAL |
| TURN OFF FIREWALL AND MALWARE PROTECTION | 6 | 3 | 1 | 0 | 4 | 1 | 15 |
| EXECUTE THE SETUP FILE DOWNLOADED DURING THE PREVIOUS TASK | 3 | 6 | 1 | 0 | 0 | 1 | 11 |
| SELECT OPTION FOR AGREEING WITH THE SOFTWARE LICENSE AGREEMENT | 1 | 1 | 0 | 0 | 0 | 1 | 3 |
| SELECT TYPE OF INSTALLATION ("TYPICAL INSTALL" RATHER THAN "CUSTOM INSTALL") | 1 | 1 | 0 | 0 | 0 | 1 | 3 |
| SPECIFY INSTALLATION DIRECTORY (ACCEPT THE DEFAULT) | 1 | 1 | 1 | 1 | 0 | 1 | 5 |
| SPECIFY USERID AND PASSWORD FOR AUTHENTICATION | 1 | 1 | 0 | 2 | 4 | 3 | 11 |
| INSTALL PROGRAM FILES | 1 | 1 | 0 | 0 | 0 | 9 | 11 |
| SPECIFY PREFERENCES (ACCEPT THE DEFAULTS) | 1 | 1 | 0 | 0 | 0 | 1 | 3 |
| TURN ON FIREWALL AND MALWARE PROTECTION | 6 | 6 | 0 | 0 | 4 | 1 | 17 |
| TOTAL | 21 | 21 | 3 | 3 | 12 | 19 | 79 |

FIG. 18

| PRIORITY RANKING | COMPLEXITY IMPACT | DESCRIPTION OF USABILITY ISSUE |
|---|---|---|
| 1 | 35 | Poor navigational guidance and high context shifting for turning firewall off before installation, and then turning it back on after installation. These tasks involve the user navigating to the Windows Security Center before and after the installation. Furthermore, the user is informed about these steps in the installation procedure documentation but then needs to search for other documentation located in an appendix (and not linked to the installation procedure documentation) to find out how to perform them. |
| 2 | 8 | No progress indication during installation of program files. The result is poor system feedback to users about the state of the installation process. |
| 3 | 4 | Poor error feedback in the user interface for the userid/password authentication step. When user enters an incorrect password then only an error code is returned by the installation program. User needs to look in online help to understand the problem and find associated recommendations. |

FIG. 18 cont.

| RECOMMENDATIONS FOR ADDRESSING USABILITY ISSUE |
|---|
| Highest impact: automate turning the firewall off an on in the installation program. This would reduce the complexity metric by 35 resulting in a 44% reduction in complexity for the task.<br>Next best alternative: incorporate the two firewall-related steps into the installation wizard. This can potentially reduce the complexity metric by 28 resulting in a 35% reduction in complexity for the task.<br>Bare minimum improvement: add task-oriented documentation for the firewall steps directly into the installation wizard. This can potentially reduce the complexity metric by 6 resulting in an 8% reduction in complexity for the task. |
| Highest impact: provide progress indication that shows estimation of time remaining that is updated every 2 seconds and that gradually increases in accuracy. This would reduce the complexity metric by 8 resulting in a 10% reduction in complexity.<br>Bare minimum improvement: provide progress indication that shows the stage of installation currently under way. This would reduce the complexity metric by 6 resulting in an 8% reduction in complexity. |
| Highest impact: provide full feedback on this error condition directly in the installation program. In addition, provide on-the-fly feedback for the userid and password so that any user errors are flagged by the interface automatically. This would reduce the complexity metric by 4 resulting in a 5% reduction in complexity.<br>Bare minimum improvement: provide full feedback on this error condition directly in the installation program, but without on-the-fly feedback. This would reduce the complexity metric by 2 resulting in a 3% reduction in complexity. |

*FIG. 20*

| STAGES | | STEPS IN EACH STAGE | PROJECT ROLES |
|---|---|---|---|
| 2010: Define quantified usability objectives | Usability objectives are defined in order to characterize the desired state of the software system under development from a usability perspective. These objectives are refined based on project constraints. | 2011. Identify the benchmark software system, targeted user roles, user tasks | Product manager |
| | | 2012. Evaluate the complexity of the benchmark software system for targeted user roles and tasks. This is used to establish a usability baseline. | Primary and secondary evaluators |
| | | 2013. Define proposed usability objectives for the software system under development using the usability baseline as a reference point. | Product manager and usability architect |
| | | 2014. Assess feasibility of proposed usability objectives and associated usability baseline given project constraints. | Software development lead, information development lead, project mgr, project executive |
| | | 2015. Revise the usability objectives & plans. Steps 2014 & 2015 are iteratively carried out until the project executive is satisfied that achievable set of usability objectives are in place. | Product manager and usability architect |

FIG. 20 cont.

| | | Each agile iteration involves the following four steps: | |
|---|---|---|---|
| 2020: Iterative software development | CUT analysis is executed during each agile iteration in order to: 1) drive plans for decreasing newly-found sources of high complexity; 2) provide regular updates to the project executive on progress towards usability objectives. | 2021. Evaluate the latest outlook for the complexity of the software system under development based on the current agile iteration. | Primary and secondary evaluators |
| | | 2022. Analyze new information stemming from previous step, particularly sources of increased complexity. | Primary evaluator |
| | | 2023. Improve usability by reviewing the results from the previous step and identifying plans for reducing sources of increased complexity. | Usability architect, product mgr, software development lead, information development lead |
| | | 2024. Report on the results of steps 2021 to 2023 to the project executive. Complexity reduction plans are refined based on feedback from the project executive and are leveraged in the next agile iteration. | Usability architect, product mgr, software development lead, information development lead, project executive |
| 2030: Create customer/ client value propositions | A final CUT analysis is carried out after development is completed. Results are leveraged in developing customer/client value proposition materials. | 2031. After agile development is completed then a final CUT analysis of the complexity of the software system is carried out. | Primary evaluator and product manager |
| | | 2032. Supporting materials that "tell the story" of the complexity analysis are assembled. | Product manager |
| | | 2033. Results of steps 2031 and 2032 are used to develop marketing materials such as presentations, white papers, and marketing websites. These materials are used to convey value propositions for targeted customers/clients of the software system. | Product manager |

COMPLEXITY REDUCTION OF USER TASKS

FIELD OF THE INVENTION

The present invention relates generally to computing system evaluation and, more particularly, to techniques for software usability engineering.

BACKGROUND OF THE INVENTION

Agile software development is characterized by factors such as relatively short-timeframe iterations (which can be as short as two-week iterations), delivery of working software as part of these iterations, and regular adaptation of requirements and designs in response to changing circumstances.

In the practice of software usability engineering, several types of usability evaluation activities are commonly employed, including usability testing and usability inspection methods. Usability testing involves empirical evaluation of user interaction with software systems through testing with participants that represent real users performing real tasks.

By contrast, usability inspection methods include evaluation of user interaction with software systems by one or more evaluators who anticipate potential problems that users will experience. Examples of usability inspection methods include heuristic evaluation, cognitive walkthrough, and formal usability inspection.

Usability testing advantageously provides direct feedback from users on how the software system will ultimately be used. Usability inspection methods, however, are generally considered to be "lighter weight" (i.e., faster and less resource intensive) to implement in comparison to usability testing.

SUMMARY OF THE INVENTION

In one aspect of the invention, an exemplary method for reducing complexity of at least one user task includes steps of calculating a complexity metric for the at least one user task; identifying one or more usability issues having a measurable impact on the complexity metric for the at least one user task; determining one or more recommendations for addressing at least one of the one or more usability issues; and displaying a representation of at least one of the one or more usability issues and of at least one of the one or more recommendations. In an illustrative embodiment, implementing any one of the one or more recommendations reduces the impact of the usability issue on the complexity metric of the at least one user task and thereby reduces a complexity of the at least one user task.

An aspect of the invention may also include a method for demonstrating reduced complexity of at least one user task in at least one of a plurality of implementations of the at least one user task. The method may include the steps of calculating at least one complexity metric for the at least one user task in each of the plurality of implementations of the at least one user task, thereby calculating a plurality of complexity metrics for the at least one user task; and displaying a representation of a reduced complexity of the at least one user task in the at least one of the plurality of implementations based at least in part on the calculated plurality of complexity metrics for the at least one user task. The representation comprises a comparison of respective ones of the plurality of complexity metrics for the at least one user task corresponding to respective ones of the plurality of implementations of the at least one user task.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 shows an exemplary rating scale for navigational guidance according to an embodiment of the invention.

FIG. 7 shows an exemplary rating scale for context shifts according to an embodiment of the invention.

FIG. 8 shows an exemplary rating scale for new concepts according to an embodiment of the invention.

FIG. 9 shows an exemplary rating scale for input parameters according to an embodiment of the invention.

FIG. 10 shows an exemplary rating scale for error feedback according to an embodiment of the invention.

FIG. 11 shows an exemplary rating scale for system feedback according to an embodiment of the invention.

FIG. 12 shows exemplary results of rating complexity dimensions according to an embodiment of the invention.

FIG. 13 shows an exemplary mapping of a navigational guidance rating into a complexity metric according to an embodiment of the invention.

FIG. 14 shows an exemplary mapping of a system feedback rating into a complexity metric according to an embodiment of the invention.

FIG. 15 shows an exemplary complex metric of a user task according to an embodiment of the invention.

FIG. 18 shows an exemplary list of top usability issues and recommendations supported by the complexity analysis according to an embodiment of the invention.

FIG. 20 shows an exemplary complexity based agile software usability engineering process according to an embodiment of the invention.

DETAILED DESCRIPTION OF PREFERRED EMBODIMENTS

Figure 1A:
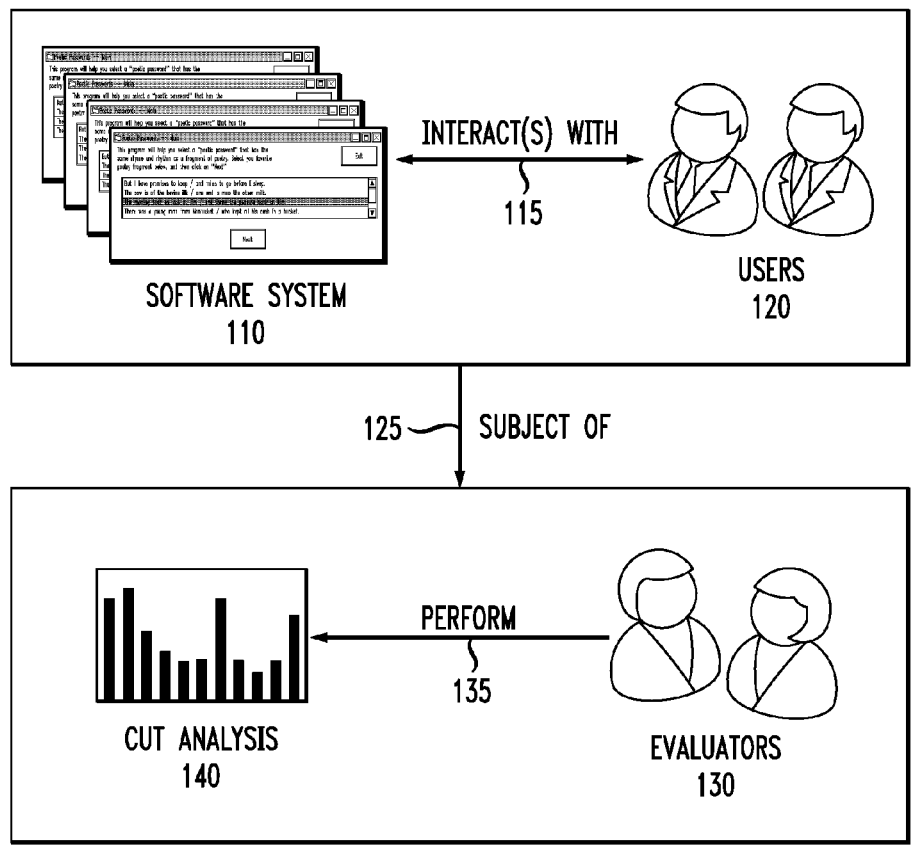
FIG. 1A shows an exemplary framework for complexity analysis of user tasks according to an embodiment of the invention.

Illustrative embodiments of the present invention are described herein with reference to the development of a software system that involves direct interaction with a human user (such as a database administrator, system administrator, or a customer care support specialist) through a user interface. Such software systems may include, for example, middleware software such as database management systems, system software such as operating systems, and application software such as customer-relationship-management systems. The user interface may include thick-client graphical interfaces, thin-client web interfaces, and non-graphical command line interfaces, or any combination thereof. The software system may have documentation associated therewith which may be delivered to users. Examples of such documentation include printed or hardcopy documentation, online help, embedded user assistance, and other documentation included as part of the user interface.

It should be noted, however, that illustrative embodiments of the present invention may be applicable to development of non-interactive software systems, as well as development of software systems using methodologies other than agile software development as described in the Agile Manifesto Principles, the disclosure of which is incorporated by reference herein. As is well-known to one skilled in the art, such other methodologies may include, for example, the Rational Unified Process (RUP), the Dynamic Systems Development Method (DSMD), Extreme Programming (XP), and Rapid Application Development (RAD). Indeed, illustrative embodiments of the present invention may even be applied to project management and systems engineering in contexts other than software development.

Conventional usability testing is further described in, for example, C. M. Barnum, Usability Testing and Research (Pearson Education, Inc., 2002), the disclosure of which is incorporated by reference herein. Conventional usability inspection methods are further described in, for example, Usability Inspection Methods, J. Nielsen & R. L. Mack, eds. (John Wiley and Sons, 1994), the disclosure of which is incorporated by reference herein.

Usability testing can be leveraged in agile development environments to gather objective feedback from representative users of the software. Furthermore, the frequent delivery of working software in agile development can enhance the effectiveness of usability testing. In particular, working software for each agile iteration can enable usability testing earlier than would otherwise be the case with a waterfall model where working software suitable for usability testing would typically not become available until the later stages of the development process.

However, agile environments pose many challenges for usability testing, such as scoping and timing issues. Scoping refers to the fact that the working software produced by each iteration of an agile development process will often not support a complete user task (i.e., the user's workflow for accomplishing a goal). However, usability testing is typically based on evaluating user performance, satisfaction, and problems in completing user tasks.

There are approaches to user testing that can be used to "fill in the gaps" for the parts of the task that are not yet supported in the working software. For example, low-fidelity prototyping (e.g., paper mockups) can be used to complete the task. However, in an agile environment these approaches can be difficult to apply due to a lack of documented design specifications of the overall system which results in little information on how to "fill in the gaps" outside of what is demonstrated by the working software.

Timing refers to the fact that cycle time for carrying out a round of usability testing with a representative sample of users will often not fit within—or even soon after—an agile iteration's timeframe, as described in P. McInerney & F. Maurer, "UCD in Agile Projects: Dream Team or Odd Couple?", Interactions, Vol. 12, No. 6, pp. 19-23, 2005, the disclosure of which is incorporated by reference herein.

When an agile iteration produces new or revised working software then associated usability testing may not happen until several days or even weeks afterwards (potentially spanning more than one subsequent iteration). Usability test execution can potentially be slowed down by numerous activities such as defining scenarios that map into the working software components and recruiting representative users that are available to participate during or soon after the agile iteration.

Although discount usability testing methods, such as those discussed in J. Nielsen, "Guerrilla HCI: Using Discount Usability Engineering to Penetrate the Intimidation Barrier," in Cost-Justifying Usability, R. G. Bias & D. J. Mayhew, eds. (Academic Press, 1994) at pp. 242-272, the disclosure of which is incorporated by reference herein, can shorten the time required for usability testing considerably, even these lighter-weight methods can easily expand beyond the timeframe of an agile iteration.

Thus, usability testing is not typically well-suited for evaluating usability in each and every iteration. However, since agile development is focused on a rapid feedback loop through frequent iterations it is important that some level of usability evaluation happen during each iteration.

Usability inspection methods can play a role in overcoming some of the challenges associated with usability testing in the agile software development context by providing quick-turn-around feedback well-suited to the timing of frequent agile iterations. For example, in contrast to the scoping issues associated with usability testing, usability inspection methods can be effectively applied to each iteration's working software deliverable in the absence of working software support for a complete user task. Likewise, in contrast to the timing issues associated with usability testing, usability inspection methods can be applied during the course of an iteration and can impact each and every iteration.

However, usability inspection methods have a number of associated drawbacks including efficacy, subjectivity, and measurement issues. With regard to efficacy in uncovering usability issues, H. W. Desurvire, "Faster, Cheaper!! Are Usability Inspection Methods as Effective as Empirical Testing?," in Usability Inspection Methods, J. Nielson & R. L. Mack, eds. (Wiley, 1994), p. 185, the disclosure of which is incorporated by reference herein, reported that no usability inspection method predicted usability problems as well as usability testing. The most effective usability inspection method (heuristic evaluation carried out by expert evaluators) found only 44% of the usability problems uncovered through usability testing, and only 29% of the most severe problems uncovered through usability testing.

One possible root cause of this diminished efficacy is that usability inspection methods depend on the individual know-how, skills, and judgment of the people carrying out the evaluation, thus making usability inspection a more subjective process than usability testing. In the case of heuristic evaluation, this subjectivity can be magnified by vague heuristics such as "The system should always keep users informed about what is going on, through appropriate feedback within reasonable time." Such heuristics require substantial interpretation to determine, for example, what is "appropriate" feedback and "reasonable" time.

Measurement issues refers to the fact that the output of usability inspection methods tends to be a set of usability problems, which do not provide an overall measurement of usability that can be used to gauge progress towards usage-oriented goals such as targeted user task completion times or user satisfaction ratings. In addition, usability inspection methods tend to produce usability issues where the severity of the issues is not quantified through any objective means. Instead, these methods tend to rely on the subjective judgment of evaluators for sorting the severity of issues into categories such as "high impact" and "low impact."

These drawbacks in usability inspection methods can dampen the effectiveness of applying these methods. Convincing development teams to respond to seemingly subjective usability issues that are not rooted in user feedback can be challenging in many circumstances.

Thus, usability evaluation in agile software development is constrained by challenges associated with usability testing (i.e., scoping and timing issues) and heuristic evaluation (i.e., efficacy, subjectivity, and measurement issues). There is accordingly a need for improved techniques for usability evaluation in agile software development.

ACUE (Agile CUT-based Usability Engineering) is a method for applying usability engineering throughout the lifecycle of an agile software development project in a low-cost and high-impact manner through the use of CUT analysis. CUT (Complexity of User Tasks) analysis provides a method for quantification of software usability, and ACUE (Agile CUT-based Usability Engineering) provides a method of leveraging CUT analysis for usability engineering in an agile software development environment. CUT analysis provides the foundational data that are leveraged in ACUE to iteratively improve the usability of a software system undergoing agile development. Although certain illustrative embodiments described herein utilize both CUT analysis and ACUE, it should be noted that these techniques may be independently implemented.

FIG. 1A shows an exemplary framework within which a CUT analysis may be performed. Software system 110 and its interactions 115 with a set of users 120 form the subject 125 of the CUT analysis 140. These interactions 115 cover a wide spectrum of activities including navigation by users 120 through the software system 110, input by users 120 of parameter values, and the output of the software system 110 in response to actions by the users 120. Evaluators 130 who are familiar with CUT analysis 140 and the software system 110 perform 135 the actual CUT analysis 140.

Figure 1B:
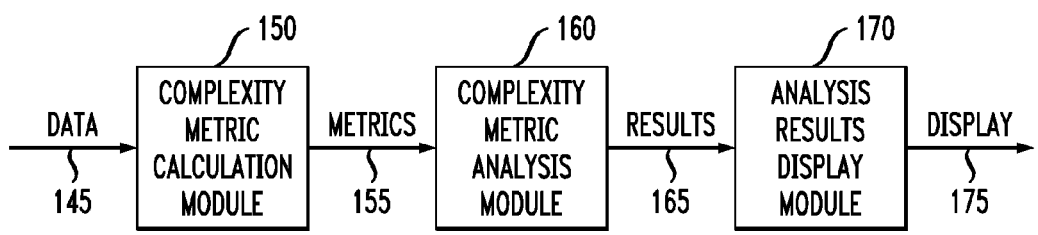
FIG. 1B shows an exemplary framework according to an illustrative embodiment of the invention.

FIG. 1B shows an exemplary framework for implementing an illustrative embodiment of the invention. Data 145 may be generated as part of the CUT analysis 140 and preferably represents one or more user tasks within at least software system 110. Data 145 is input to complexity metrics calculation module 150, which generates one or more complexity metrics 155 based at least in part on the data. Complexity metrics analysis module 160 performs an analysis of the complexity metrics 155 to produce results 165. The results 165 are processed by analysis results display module 170 to produce a display 175, which may, for example, be presented to evaluators 130. Illustrative embodiments of components 145, 150 and 155 will be described in detail hereinafter, for example, with reference to FIGS. 12-15. Illustrative embodiments of components 160, 165, 170 and 175 will be described in detail hereinafter, for example, with reference to, for example, FIGS. 17-19.

The CUT analysis can be applied to various stages of software system development. For example, CUT analysis may be performed in an early stage of development, before any software is coded or prototyped but at the point where an initial representation of at least some of the software externals are available. This representation can be in the form of a formal written specification or an informal design direction that can be articulated by someone on the development team (for example, the lead software architect). Relative to the subsequent stages of development, this early stage has the most opportunity to address a wide range of usability issues identified through CUT analysis because: 1) more remaining development time and resources are available; 2) less code rework is required to address usability issues since code implementation has not yet begun.

The CUT analysis may additionally or alternatively be performed during a mid-level stage of development where prototypes or agile iterations of code are available. At this stage, there is typically a reasonable opportunity to address a wide range of usability issues identified through CUT analysis, although less so than in the early stages described in the preceding point.

The CUT analysis may additionally or alternatively be performed during a later stage of development where alpha-level or beta-level code is available. At this stage, CUT analysis can be used to identify high-priority "stop-shipment" usability issues that need to be addressed before releasing the software and to provide input to the next version of the software system. However, there is typically little opportunity to address lower-priority usability issues at this stage.

The CUT analysis may additionally or alternatively be performed during a post-development stage when the fully-functional software system is released and deployed into user environments. Applying CUT analysis at this stage is typically used to identify candidate usability issues for the next version of the software system and/or to provide a usability benchmark for the next version.

Figure 2:
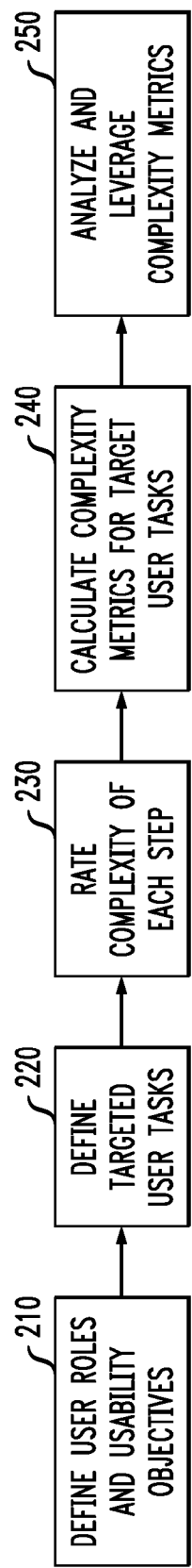
FIG. 2 shows an exemplary process for complexity analysis of user tasks according to an embodiment of the invention.

FIG. 2 shows an illustrative embodiment of a CUT analysis process (e.g., 130 in FIG. 1). An exemplary CUT analysis process may begin with step 210, in which user roles and usability objectives are defined. This may include defining classifications of users who are being targeted for using the software system, and characterizing the desired state of usability of the software system for the targeted users. More particularly, user roles characterize the types of users that interact with the software system, and usability objectives identify the desired state for how well the software system supports those users from a usability perspective. User roles and usability objectives may be defined in parallel with each other, and usability objectives may be expressed using user roles.

A user role may be viewed as a set of attributes that represents a class of users and their goals in using the software system being analyzed. In one embodiment, a user role could be defined by attributes including goals, skills and expectations. In such an embodiment, the user role "casual instant messenger user" could be defined as follows:

Goal: Uses their home computer for staying in touch with friends and family through e-mail and instant messaging.

Skills: Very limited experience and skills with computers, not an IT professional. Familiar with the basics of using e-mail and browsers on Windows Vista.

Expectations: Low tolerance for using software they cannot figure out quickly. Will not spend time calling for technical support or searching through newsgroup postings for assistance with software issues.

A user role is typically more than just a job title such as "IT architect" because people's jobs tend to cover a broader scope of activities. User roles are specifically focused on factors pertinent to interaction with a software system and not on a broader range of job responsibilities. In one embodiment, the user roles in a CUT analysis could resemble the user roles described in L. L. Constantine & L. A. D. Lockwood, *Software for Use: A Practical Guide to the Essential Models and Methods of Usage-Centered Design*, Addison-Wesley 1999, the disclosure of which is incorporated by reference herein.

Defining user roles may be helpful in performing a CUT analysis because complexity is not an absolute. Backing up a database may be a relatively simple task for an experienced database administrator but that same task may be very complex for someone who has never previously used a database management system. Therefore, it may be helpful to define the complexity of a task relative to the type of user who is performing the task.

Step 210 may include defining a set of targeted personas which may be performed in addition to or as an alternative to defining the targeted user roles. A persona is a detailed description of a fictitious person that is being targeted for the software system being analyzed. A persona description includes topics such as the person's goals, skills, attitudes, working environment, and even some personal details. Personas tend to be more detailed and specific than user role definitions. For example, personas may be implemented in a manner similar to that described in A. Cooper, *The Inmates Are Running the Asylum: Why High Tech Products Drive Us Crazy and How to Restore the Sanity*, Sams Publishing 1999, the disclosure of which is incorporated by reference herein. Although illustrative embodiments described herein refer to user roles, it should be understood that personas may be used instead of or in addition to user roles.

Note that it is not always necessary to define all possible user roles for the software system that is the subject of CUT analysis. Only the user roles identified in the usability objectives need to be defined. Other user roles may also exist but are not the focus of the usability objectives and therefore do not need to be identified for CUT analysis.

A usability objective characterizes the desired state of the software system from a usability perspective by identifying explicit and measurable success factors. Usability objectives could help identify the subject domain that is targeted for CUT analysis. For example, usability objectives can be used to narrow down CUT analysis from a general area like "using SuperDuperIM" to targeted focus areas such as "setting up SuperDuperIM" and "contact management with SuperDuperIM" for the user role "casual instant messenger user."

Usability objectives may focus on tasks that are common and/or high-importance work activities for the targeted user roles in order to help ensure that the CUT analysis is being carried out on a significant part of the user's interactions with the software system and, therefore, that the CUT analysis itself will be of high significance.

For example, a usability objective may include improvement relative to a previous release of the software system. This type of usability objective may be helpful, for example, where a software system is currently in use and some usability issues have been identified through feedback from users through channels such as analysis of calls to technical support staff or field surveys of users. As the development team begins working on the next release they could choose a usability objective that addresses the feedback from users of the currently-available release, and express this objective relative to the currently-available release. For example, a field survey of users of a system administration product indicates security administration is too time consuming for occasional users of the product. As a result the following usability objective could formulated for the next release of this product: "Decrease time spent on key security administration tasks by 50% relative to the currently-available release for the 'occasional security administrator' user role."

A usability objective could also include superiority relative to a competing solution. This type of usability objective may be helpful, for example, where a competitive solution to the software system under development is targeted as a "best of breed" usability leadership product, and where usability is a key factor for user adoption. In such cases, the software system under development could need to be a significant improvement over the competitive solution in order to warrant its adoption.

For example, imagine a scenario where an instant-messaging product called "SuperIM" is known for its quick setup time and ease of managing instant messaging contacts. SuperIM is targeted as the key competitor for a new instant-messaging product under development called "SuperDuperIM." Two of the usability objectives of SuperDuperIM could be "25% faster setup than SuperIM" and "25% easier contact management than SuperIM." Both of these objectives could be defined for the user role "casual instant messenger user" described above.

A usability objective could also include targeted absolute values for metrics. This type of usability objective may be helpful, for example, where an IT project in an organization is undertaken with a set of usability requirements expressed in absolute terms rather than the relative terms used in the preceding two points. For example, a payroll department for a large enterprise could require that the total complexity of all daily tasks carried out by its payroll entry clerks not exceed a complexity metric value of 550. This particular value could have been derived from a combination of CUT analysis of software tasks for similarly-skilled workers in other departments as well as productivity improvement targets set by senior managers.

A usability objective could also include mitigation of issues. For example, a usability objective could be as simple as "mitigate the top usability issues uncovered during development for tasks performed by 'occasional security administrator' role." In such cases, the objective is simply to identify usability issues and try to mitigate their impact as much as possible.

Step 220 includes defining targeted user tasks. A task may represent a goal-oriented interaction with the software system from the perspective of one user role. If interactions with more than one goal or more than one user role are involved, it may be broken down into more than one task in order to help limit the user tasks to a scope that is appropriate for CUT analysis. Moreover, a task could be expressed in language and terms that users understand to help ensure that CUT analysis can be communicated effectively to others and is not obscured by terminology outside the scope of the targeted user role. In one embodiment, these user tasks may be similar to essential use cases as defined by Constantine & Lockwood, supra. As will be discussed in greater detail below with reference to FIG. 3, step 220 may include scoping out and ordering the user tasks that will be the subject of the CUT analysis, and then breaking down those tasks into their constituent steps.

Step 230 includes rating the complexity of each step in the targeted user tasks. As will be discussed in greater detail below with reference to FIGS. 4-13, step 230 may include rating each step using a set of complexity dimensions, each of which has a set of objective requirements for determining a numeric rating. Step 240 includes calculating complexity metrics for the targeted user tasks. As will be discussed in greater detail below with reference to FIGS. 14 and 15, step 240 may include applying predefined mappings between the ratings derived in step 230 and the associated complexity metrics. Step 250 includes analyzing and leveraging the complexity metrics calculated in step 240. As will be discussed in greater detail below with reference to FIGS. 16-18, step 250 may include, for example, identifying the steps within the user tasks that have high relative complexity metric values and then reviewing the rationale for the associated complexity ratings for those steps to identify areas that need improvement.

Figure 3:
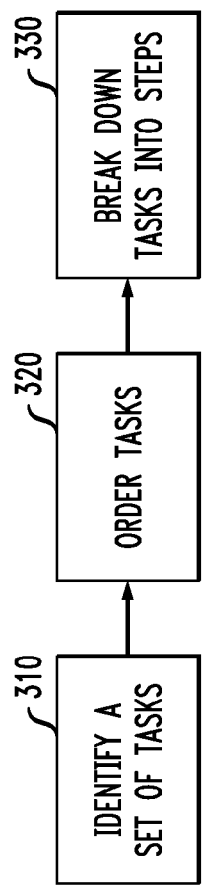
FIG. 3 shows an exemplary process for complexity analysis of user tasks according to an embodiment of the invention.

FIG. 3 shows an exemplary process for defining one or more user tasks for CUT analysis (e.g., step 220 in FIG. 2). This process begins with step 310, which includes identifying a set of tasks that will be targeted. As heretofore discussed, these tasks define the scope of the CUT analysis. As discussed above, each task preferably represents usage of the software system by one user role. If more than one user role is involved then the task should be broken down into smaller tasks, each of which involves only one user role.

Identifying a set of tasks that will be targeted for CUT analysis may be an intersection of the usability objectives for the software system, which identify the task areas that should be the focus of CUT analysis, and on the user experience design specifications or working code drivers which are available at a given point in time in the development cycle. In one embodiment, tasks that are targeted by the usability objectives and that are in the currently-available specifications/working code define the scope of tasks identified for CUT analysis.

In the case of an iteration for an agile project, the working code being targeted for an agile iteration can, along with the working code developed for previous iterations, determine the scope of the CUT analysis. Note that if only partial tasks are supported for the working code in an agile iteration then only those partial tasks would be targeted for CUT analysis. CUT analysis does not require full and complete support for tasks in the working code; it can be applied to a fragment of a user task in a given iteration and then reapplied to a broader fragment of the user task in a subsequent iteration as support for that user task evolves through the agile process.

In an illustrative embodiment, a set of tasks targeted for CUT analysis may each be associated with the user role "casual instant messenger user" discussed above with reference to step 210 in FIG. 2. This set of tasks may be characterized as follows:

Setup of SuperDuperIM involves the following tasks:
Downloading SuperDuperIM from the SuperDuperIM website using common browsers on Windows Vista.
Installing and configuring SuperDuperIM on Windows Vista.
Contact management with SuperDuperIM involves the following tasks:
Adding a contact from scratch (i.e., no contextual information available for the contact)
Adding a contact while in the process of carrying out a chat with the contact
Changing a contact
Deleting a contact Step 320 in FIG. 3 may include arranging the set of tasks into a temporal order in which users are expected to perform the tasks. This temporal ordering is performed because the results of CUT analysis can vary depending on the ordering of tasks. The temporal order involves some combination of sequential and non-sequential sets of tasks. An example of such an ordering of tasks is:

1. Setup of SuperDuperIM involves the following tasks:
   a. Downloading SuperDuperIM from the product's website using common browsers on Windows Vista.
   b. Installing and configuring SuperDuperIM on Windows Vista.
2. Contact management with SuperDuperIM involves the following tasks:
   a. Adding a contact (one or both of the following tasks are performed):
   Adding a contact from scratch (i.e., no contextual information available for the contact)
   Adding a contact while in the process of carrying out a chat with the contact
   b. Working with existing contacts (one or both of the following tasks are performed):
   Changing a contact
   Deleting a contact Sequential task ordering (such as task 1a being performed before task 1b in the above example) may be used, for example, when one task needs to be performed as a prerequisite for a subsequent task. In situations where users are expected to start with basic tasks and work their way up to more advanced tasks, although the basic task may not be a prerequisite for the advanced tasks, users may be expected to encounter tasks in this order and therefore this sequence may be used in performing CUT analysis. On the other hand, non-sequential tasks (such as the two "Adding a contact" tasks under 2a in the above example) may be used when there are no prerequisite relationships between the tasks and we have no expectations that users will perform one task before the other.

In step 330 of FIG. 3, each individual task is broken down into its constituent steps. These steps define the workflow followed by the user in performing the task, and are the atomic level at which CUT analysis is carried out. For example, the task "Installing and configuring SuperDuperIM on Windows Vista" may involve the following steps:
1. Turn off firewall and malware protection
2. Execute the setup file downloaded during the previous task.
3. Select option for agreeing with the software license agreement.
4. Select type of installation by selecting "typical install" (rather than "custom install").
5. Specify installation directory (accept the default).
6. Specify userid and password for authentication.
7. Install program files.
8. Specify preferences (accept the defaults) to complete the setup.
9. Turn on firewall and malware protection.

The steps of a task define exactly one path through the software system to achieve the targeted user goals of the task. It may often be preferable to choose the shortest, most efficient path to achieve the task goal, as optimizing this path may help optimize overall usability for the task.

However, a path may be selected based on, for example, the fact that user data for an existing release of the software system may indicate common paths taken by users for performing this task. These common paths may not be the optimal or most efficient paths as intended by the designers of the software, but nevertheless these are the paths that users choose for reasons such as familiarity. In these cases, it would be helpful to consider performing the CUT analysis based on these common paths.

The release under development may be focused on new features that support a new path meant to simplify the task (for example, a new wizard that automates a previously complicated path). In these cases there would be value for the design team in performing CUT analysis on the new path. In an instance where both a common path and corresponding new path are available, it may be helpful to focus CUT analysis on both the common path and the new path, with the intent of measuring the efficacy of the new path relative to the common path.

Typically, each step includes one or more user actions and a system response. Examples of user actions are "click on the 'typical install' radio button" and "click on the 'Next' pushbutton." An example of a system response may be a wizard changing from an initial page to the succeeding page in its sequence in response to the user completing the initial page and then selecting the Next pushbutton. The term "action step" is used to refer to steps that involve concrete user actions and a corresponding system response.

The level of detail used to define the steps in a task is driven by user intentions. Specifically, each step is defined by a user intention rather than user actions. For example, the user intention is "Select the type of installation" and the corresponding user actions are "click on the 'typical install' radio button" and then "click on the 'Next' pushbutton."

A helpful heuristic rule for defining steps is that the step should be realizable through various possible designs and should not be locked into one specific design. Using the example of selecting the type of installation, this step can be realized, for example, through a radio button group selection in an installation wizard, through a drop-down list selection in a non-wizard installation dialog, or through a command option entered at a command line.

A type of step that is not an action step (i.e., does not comprise concrete user actions and a corresponding system response) is called a "planning step," which consists of a significant user decision. The decision may involve users clarifying what they want to do (i.e., their goals) or how they're going to do it (e.g., their method or tools). Furthermore, the decision may be significant in that the decision affects the sequence of the downstream task flow and is essential for the user to proceed with the task. Note that if a decision is limited in scope to selections that affect only one action step and not the overall task flow then a planning step for that decision is likely not warranted, and the decision can instead be encapsulated as part of the corresponding action step.

The decision associated with a planning step typically does not have a corresponding action step that requires the user to explicitly specify the result of the decision. An example of an action step that requires the user to specify the result of a significant decision is step 4 "Select type of installation" for the task "Installing and configuring SuperDuperIM on Windows Vista" shown earlier. The complexity associated with the decision of selecting the type of installation is encapsulated in this action step and does not therefore warrant a separate planning step. Typically, the decision associated with the planning step does not involve interaction with the system other than reading product documentation.

In an illustrative embodiment, planning steps are only used in cases where a decision that meets all of the above characteristics is required. The following are examples of such planning steps:

"Decide on whether to move data using the DB2 import utility or the DB2 load utility" may affect the downstream task flow since these two utilities have different options and behaviors.

"Decide on whether to install the WebSphere administration console on a single machine or in a multi-tier environment" may affect the task flow of the subsequent installation process.

"Select AIX resources that will be monitored" may affect the downstream task flow associated with setting up and using system monitoring.

"Define a DB2 workload management configuration that implements the targeted workload management objectives" may affect which workload management objects need to be created in downstream steps.

Each planning step will typically spawn a series of action steps and, consequently, planning steps typically occur less frequently than to action steps. Furthermore, many user tasks do not include any planning steps at all because all their significant decisions are represented in action steps. For example, the task "Installing and configuring SuperDuperIM on Windows Vista" shown above does not include any planning steps.

Figure 4:
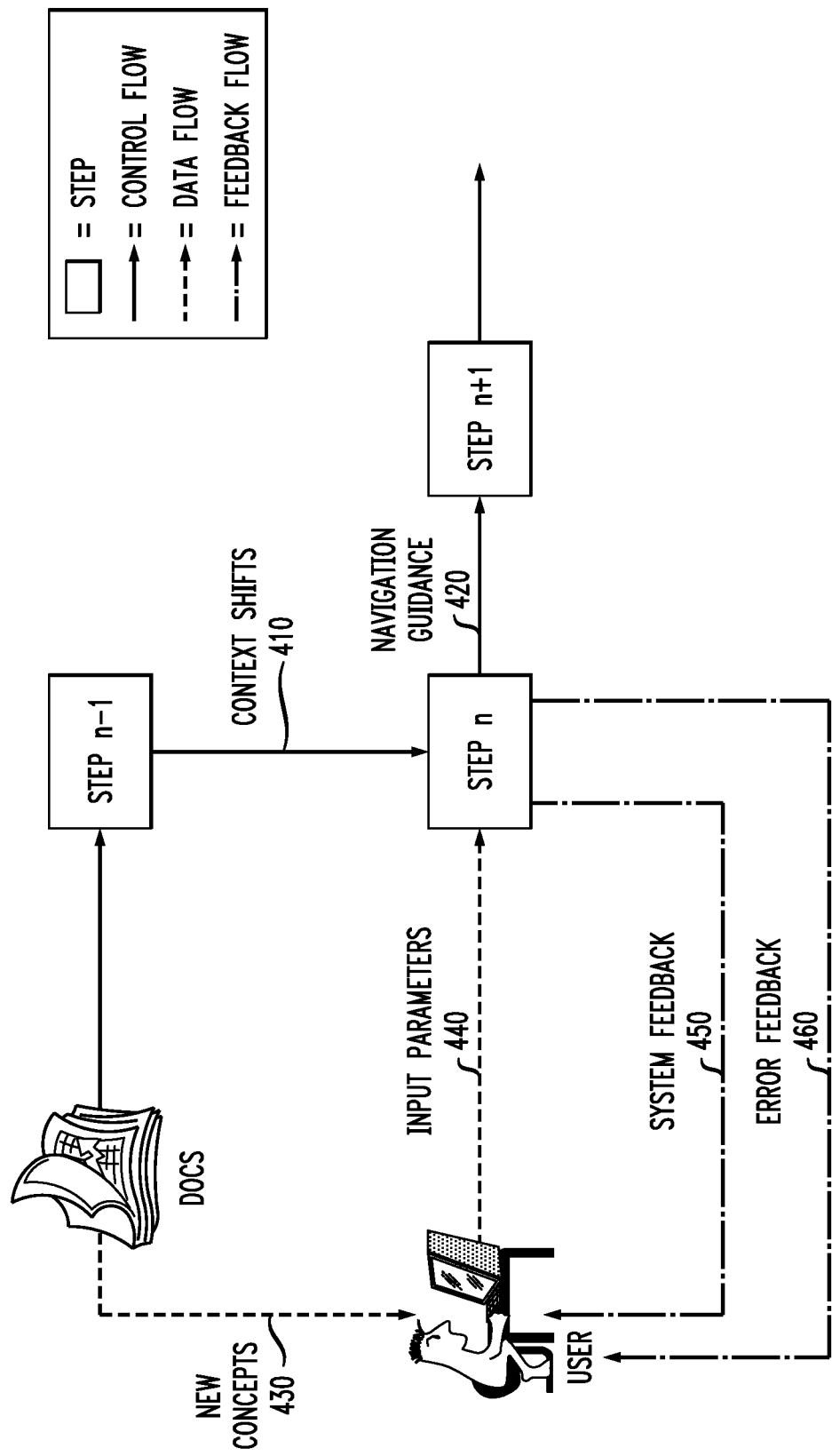
FIG. 4 shows an exemplary user task complexity model according to an embodiment of the invention.

FIG. 4 shows an exemplary user task complexity model which may be used in rating the complexity of each step in the tasks (e.g., step 230 in FIG. 2). This user task complexity model typically includes one or more complexity dimensions, each of which captures a potential source of complexity experienced by the user while interacting with the software system to perform a user task. For example, the exemplary user task complexity model shown in FIG. 4 includes the following complexity dimensions:

Context shifts 410: A context shift occurs when the user moves from one work area to another in order to perform a step. A work area is defined as a pane in a tiled graphical user interface (for example, a view in an eclipse perspective), a wizard, a dialog box, a command line window and/or session, and/or a text editing window and/or session.

Navigational guidance 420: Navigation refers to the user moving through the user interface to proceed from one step to the next and to proceed through a step. Navigational guidance refers to the assistance provided by the user interface and documentation to help the user navigate into and through a step.

New concepts 430: A concept is background information on a topic area that the user needs to understand in order to perform a step. Concepts include the underlying externals model of the software system and user interface objects, metaphors and/or models. A new concept for a step is a concept that is introduced to the user for the first time in the overall task ordering. That is, a new concept for a given step is a concept that the user will not encounter (or need to understand) in either any of the preceding steps of the user task nor in any of the steps of tasks that precede the task of this step.

Input parameters 440: An input parameter is data supplied by the user to complete the step.

System feedback 450: System feedback is the system response to the user actions for a given step with the exception of error feedback 460 which is addressed in the next point. Examples of system feedback include progress indication dialog boxes, confirmation of command execution, and system output such as reports.

Error feedback 460: The user may encounter error situations in performing the step. Error feedback is the effectiveness of the system response to these error situations.

Context shifts 410 and navigation guidance 420 may be viewed as control flows. New concepts 430 and input parameters 440 may be viewed as data flows. System feedback 450 and error feedback 460 may be viewed as feedback flows.

Figure 5:
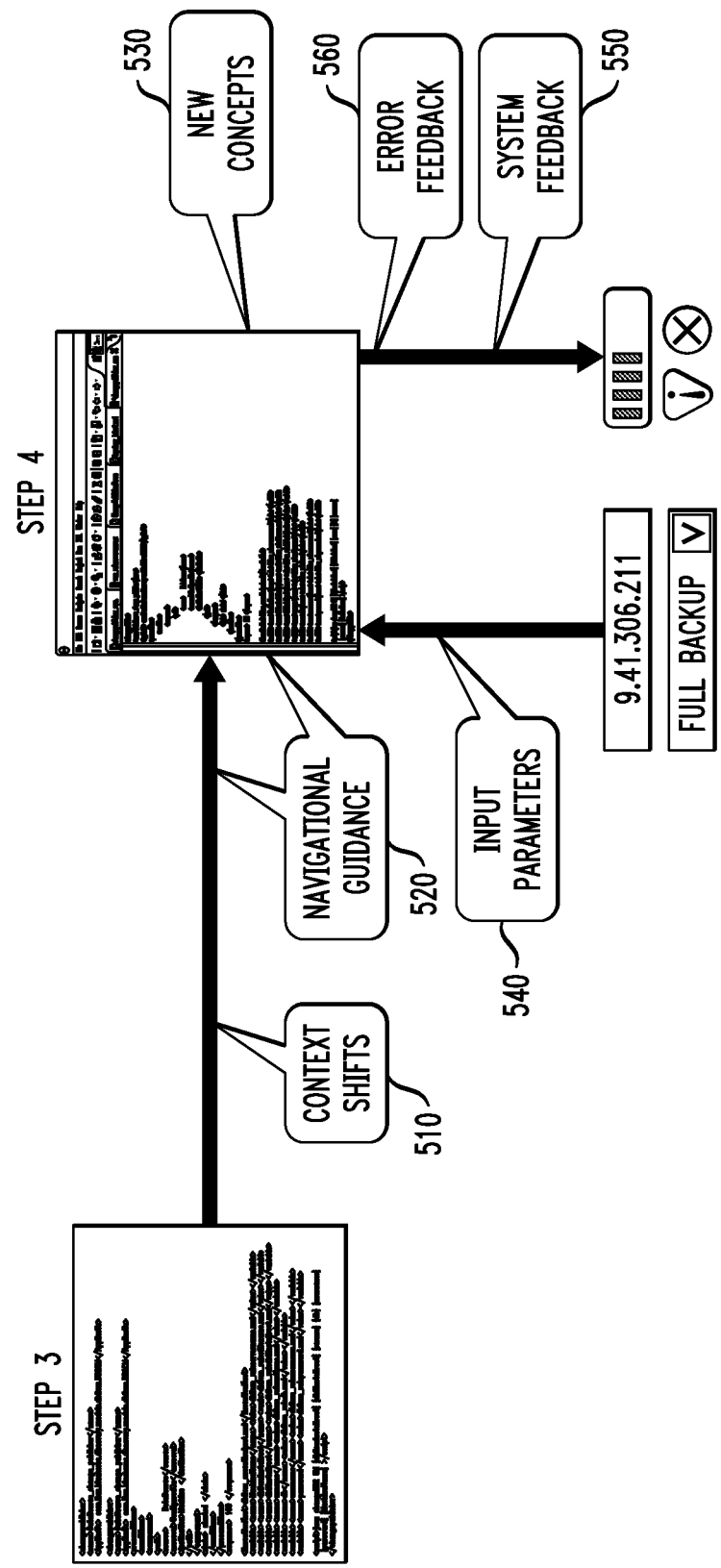
FIG. 5 shows an exemplary complexity dimensions according to an embodiment of the invention.

FIG. 5 illustrates these complexity dimensions for an example in which a user interacts with a software system in Step 4 of a task. Context shifts 510 and navigational guidance 520 are factors as the user proceeds from the preceding step (Step 3) to Step 4 as well as through Step 4. In this task flow the user shifts from a command line interface in Step 3 to a graphical user interface in Step 4. The user provides input parameters 540 to the user interface as part of Step 4 and, in return, the software responds with system feedback 550 and error feedback 560. Throughout the step the user may encounter new concepts 530 that need to be understood in order to successfully complete the step and proceed onwards through the task.

In an illustrative embodiment, an ordinal rating scale is defined for each of these complexity dimensions with objective requirements defined for each point on the scale. The evaluator may determine the rating by starting with the least complex rating (e.g., Level 1) and evaluating whether the software system's support for the step meets the stated requirements. If the requirements are met then that rating is assigned to the step. If not, the evaluator proceeds to the next rating in the scale (e.g., Level 2). The evaluator once again evaluates whether the requirements are met and if so then that rating is assigned to the step. If not, the evaluator proceeds to the next rating in the scale (e.g., Level 3) and repeats the evaluation process. This procedure continues until the evaluator finds a rating for which the requirements are met. This procedure of determining a rating for each complexity dimension is carried out for each step of the task.

FIG. 6 summarizes an exemplary rating scale for navigational guidance, which includes Level 1 through Level 5. Level 1 indicates well-constrained user interface navigation. Level 1 requires a user interface which guides the user into and through the step such that there is no need for the user to rely on documentation for navigating into and through this step other than embedded user assistance. Level 1 also requires a well-constrained set of navigational choices. An example of Level 1 navigational guidance would be a wizard where the user proceeds into the step through selection of the "Next" button and then completes the step by entering values in a set of input fields on the wizard page, such that the step maps directly into completion of a page in the wizard.

Level 2 indicates basic user interface navigation. Like Level 1, Level 2 requires a user interface which guides user into and through the step such that there is no need for the user to rely on documentation for navigating into and through this step other than embedded user assistance. However, whereas Level 1 requires a well-constrained set of navigational choices, Level 2 is characterized by the user having several choices to make in navigating into and through the step. An example of Level 2 may be a web browser in which changing the color of web page links requires selection of "Tools" and "Internet Options . . . " from drop-down menus, selection of a "Colors" pushbutton, and finally completion of a dialog.

Level 3 indicates navigation which is supported by complete task-oriented documentation. Here, complete task-oriented documentation guides the user into and through the step. Documentation for the step is no more than one link away from mainline documentation for overall task and documentation is clear and complete. An example of Level 3 navigation guidance would be a step that is fully documented in a procedural description of the overall user task in online documentation.

Level 4 indicates navigation which is supported by basic documentation. Level 4 merely requires that some level of documentation be provided for navigating into and/or through the step. In Level 4, documentation for the task requires significant searching and/or following of links, or is lacking in clarity or completeness. For example, documentation for navigating into and through the step may be spread across different documents and not linked together such that users will need to search for the relevant documentation and piece it together themselves.

Level 5 indicates unsupported navigation in which there is no user interface or documentation support for enabling users to complete the navigation on their own. For example, because documentation on how to navigate into and/or through the step is missing, the user may need to seek support of others (e.g., community support, official support channels) or rely on experimentation.

FIG. 7 summarizes an exemplary rating scale for context shifts in which there is one rating between Level 1 and Level 3 assigned to a step for each context shift encountered by the user in the step. Level 1 indicates an intra-tool context shift in which the user stays in the current workspace or moves from one workspace to another workspace within the same UI platform. For example, a step may involve navigating from the primary window of a graphical user interface to a dialog box spawned by the primary window.

Level 2 indicates an inter-tool context shift in which the user moves from one workspace to another workspace in a different UI platform but within the same product. An example of a Level 2 context shift would be where the user jumps from a DB2 GUI tool (e.g., Data Studio) to a DB2 command line (i.e., the CLP).

Level 3 indicates a cross-product context shift in which the user moves across product workspaces. An example of a Level 3 context shift would be where the user moves between a DB2 and a non-DB2 workspace, as in the case of tasks that take the user from DB2 to other products such as WAS or AIX.

FIG. 8 summarizes an exemplary rating scale for new concepts in which one rating is assigned per step and is based on the most complex new concept in the step. Level 0 indicates that no new concepts are introduced in this step for the targeted user role. All concepts that need to be understood for this step were introduced in a preceding step. For example, step 1 may consists of creating a new workload, as does step 9 of the same task. Therefore, step 9 does not introduce any new concepts since step 1 has introduced any new concepts required for creating a new workload.

Level 1 indicates that all new concepts introduced in this step are common concepts for the targeted user role (i.e., common with other products used by the targeted user role). For example, common concepts for database administrators may include tables, views, indexes, concurrency and backups. Common UI concepts for Eclipse may include project and perspective.

Level 2 indicates a simple documentation reference. In Level 2, at least one new concept introduced in this step is not a common concept for the targeted user role. However, all of these uncommon concepts are explained in one module of product documentation. All the uncommon concepts are explicitly called out in the user interface or product documentation. Any prerequisite concepts needed to understand uncommon concepts introduced in this step are common concepts and are explicitly called out in the user interface or product documentation. For example, for the concept "understanding the difference between circular and archive logging" it would be sufficient to read one article in the DB2 Information Center.

Level 3 indicates a complex documentation reference. Again, at least one new concept introduced in this step is not a common concept and the uncommon concepts are explained in product documentation. However, Level 3 indicates that a complex documentation reference is required which does not meet the requirements of Level 2. For example, understanding how to improve the load performance for MDC in DB2 may require an understanding of prerequisite concepts such as utility heap size and these prerequisites are not common concepts.

Level 4 indicates an undocumented concept in which at least one new uncommon concept is not explained well enough in the product documentation for users to complete this step. Users may need to rely on sources other than product documentation (e.g., community support, official technical support channels for the product). For example, a product may include a "hidden" feature that is not explained in its documentation. Any step that introduces uncommon concepts associated with this hidden feature receives a Level 4 new concept rating.

FIG. 9 summarizes an exemplary rating scale for input parameters in which one rating between Level 0 and Level 6 is assigned for each input parameter that needs to be entered by the user in each step.

Level 0 indicates a reused parameter. The input parameter value may have been produced by the system in an earlier step of the task flow or entered by the user in an earlier step of the task flow. Moreover, the parameter's description in the user interface or documentation for this step is the same as that of a parameter used in a previous step. For example, an installation utility may show that the product was installed in c:\Program Files\xyz and the user is then asked to enter the product's installation directory in a subsequent step.

Level 1 indicates a free-choice parameter in which the parameter value can be chosen freely subject to commonly-understood constraints that do not require the expertise of a user experienced with this product. For example, a user may be required to enter a new password subject to standard password constraints.

Level 2 indicates a documentation-direct parameter for which the parameter value can be taken directly from the product's documentation with no adaptation required. Product documentation for this parameter value is in one place that is easily found through search or through scanning the table of contents. For example, the product documentation specifies entry of the command: "rpm-ivh pkgname.rpm" and the user enters the command exactly as shown in product documentation to complete this step.

Level 3 indicates a documentation-adapted parameter. The parameter value may be based on product documentation but requires adaptation and/or customization for this step, or the user may need to draw on their own recollection or records for the parameter value. For example, a step involves taking the following example from the DB2 Information Center and adapting the database name (which is "mydb" in this example) to apply to the context of the user task: db2 restore db mydb replace existing redirect Level 4 indicates an expertise-based parameter for which the parameter value requires the expertise of an experienced user but does not require further investigation of the system. For example, an experienced DBA would know they want to select archive logging when configuring logging for a database.

Level 5 indicates an environment-fixed parameter for which the parameter value is constrained by the environment to a specific value. The user may need to investigate the system to determine the parameter value or to consult with another person to determine the parameter value. For example, the user may need to determine the path to a pre-installed executable or the listening port number of a TCP/IP server.

Level 6 indicates an environment-constrained parameter for which the parameter value is constrained by the environment to a set of non-obvious choices that require specialized expertise and investigation of the system. For example, a database administrator may need to analyze monitoring data in order to set a WLM threshold value. There may be no single "right" answer; analysis and experience may be required to determine an appropriate threshold value.

FIG. 10 summarizes an exemplary rating scale for error feedback. Here, a rating between Level 0 and Level 5 is assigned to a step based on the worst-case error condition uncovered for the step. Level 0 indicates that no errors are possible for the step. For example, a step may consist of completing a wizard page that includes only a radio button group with a default value already selected. The user cannot generate errors regardless of which selection they make.

Level 1 indicates complete UI-based error feedback in which the user interface clearly reports error conditions and provides helpful and complete recommendations on diagnosing and fixing problems in common situations. The recommendations should be specific to the context of the error condition rather than generalizations. The interface should present one particular recommendation rather than presenting a list of possible recommendations that the user needs to investigate. The user should not need to search for the error in the user interface but, instead, should be taken directly to where the error has occurred. Error feedback should be delivered automatically and in an "on-the-fly" manner without requiring the user to explicitly invoke a separate action to invoke the feedback.

For example, when a step consists of filling out a dialog box to copy a file, any text entry in the dialog box (e.g., specifying target file name) is dynamically parsed to validate that the file name syntax is valid. Error feedback such as "invalid file name" is delivered where the error has occurred (e.g., next to the text box for the target file name). If an error occurs after the dialog box is filled in and OK is pressed (e.g., "insufficient space to create a copy of the file") then the feedback should include a specific recommendation on how to resolve the problem (e.g., "delete unnecessary files and then retry the operation").

Level 2 indicates basic UI-based error feedback. Here, the user interface clearly reports error conditions and provides helpful and/or complete recommendations on diagnosing and fixing problems in common situations. Furthermore, recommendations are specific to the context of the error condition rather than generalizations.

For example, an error message consisting of only "The bind file name is not valid" would be too general for Level 1. A specific feedback message suitable for Level 1 would provide the name of the bind file name, the name of the associated package, and an explanation for why the bind file name is not valid (e.g., too long, invalid characters).

Level 3 indicates complete documentation-based error feedback. The user interface reports error conditions but does not provide helpful and complete recommendations for diagnosing and fixing the problems. However, the product documentation provides clear, complete, easily found, and helpful information on diagnosing and fixing the problem based on the error conditions reported in the user interface. Furthermore, the user can find all the information required to diagnose and fix the problem in one place in the product documentation and does not need to search through documentation for other products.

For example, a command may return an error code and a brief message that is not sufficient to solve the problem. The user then enters a command that invokes extended help on the error code and the resulting online message text provides helpful information for diagnosing and fixing the problem all conveniently located in one place.

Level 4 indicates basic documentation-based error feedback. As in Level 3, the user interface reports error conditions but does not provide helpful and complete recommendations for diagnosing and fixing the problems, and the product documentation is sufficient to diagnose and fix the problem based on the error conditions reported in the user interface. However, the documentation is not located in one place or is not clear, complete, and easily found. For example, the user may need to search through several articles in product documentation and then piece together the information to resolve the problem.

Level 5 indicates inadequate error feedback in which there is no effective user interface support and product documentation support for diagnosing and fixing problems. The user may need to resort to newsgroups, a support call, or other such means to resolve problems.

FIG. 11 summarizes an exemplary rating scale for system feedback in which one rating between Level 0 and Level 3 is assigned for the most complex system feedback in the step. Level 0 indicates no system feedback and would typically apply only to planning steps, all of which may be assigned Level 0 system feedback. For example, a user decides whether to install an administration console on a single machine or in a multi-tier environment. This planning step involves no user actions and therefore no system feedback.

Level 1 indicates easily-consumed feedback in which the system provides feedback confirming user actions. If the operation takes more than one second, the system should also provide progress information, and the progress information should not stay in any one state for longer than 20% of total time. System feedback should have low information clutter with no extraneous information. The system should a return a low volume of information such that everything can be displayed without scrolling in a maximized command line window or maximized graphical interface. System feedback should be delivered automatically and in the same workspace where the user invoked the operation. For example, entering the command "quiesce database immediate" may produce the system response "The QUIESCE DATABASE command completed successfully" and no other output.

Level 2 indicates manageable feedback. The system provides feedback confirming user actions and, if the operation takes more than one second, progress information. System feedback has low information clutter or the ability to filter away information clutter. For example, an Activity Monitor may produce potentially long reports in tabular GUI widgets that allow sorting on columns such as "Application ID" and "Total CPU time." Therefore, if the objective of a step is to identify the top CPU time consumers for a specific application ID, then an Activity Monitor report would satisfy the requirement of filtering away information clutter.

Level 3 indicates difficult-to-consume feedback which does not meet Level 1 or 2 requirements. For example, commands that return large volumes of data to the command window and require the user to manually sift through the data to find relevant details for their task would be assigned to Level 3.

FIG. 12 summarizes the results of complexity ratings for the task example "Installing and configuring SuperDuperIM on Windows Vista." For an example of how to determine complexity ratings, consider the first step in the example discussed above (that is, "Turn off firewall and malware protection"). Details of how this step is supported by SuperDuperIM are provided below to illustrate the rationale for each rating.

For the "navigational guidance" dimension this step is rated as Level 4 (navigation supported by basic documentation). Levels 1 and 2 are not satisfied by this step because there is no user interface guidance for navigating the user to turn off firewall and malware protection. Instead, the user has to read the documentation to find out that this step is required and to find out how to perform it. The next level down (Level 3. navigation supported by complete task-oriented documentation) is not satisfied because the documentation for completing this step is not contained within the confines of task-oriented documentation that covers the overall task. The user is informed about needing to turn off the firewall and malware protection in the installation procedure but then needs to search for other documentation located in an appendix (and not linked to the installation procedure documentation) to find instructions on how to perform this step.

For the "context shifts" dimension, this step is rated as "Level 2 (inter-tool)." At the beginning of this step the user has completed the preceding task of downloading the setup file for SuperDuperIM to their Windows desktop. In order to turn off firewall and malware protection the user needs to move from the Windows desktop to the Windows Security Center. The user stays within the same software product (that is, the Windows operating system) in carrying out this step and therefore it is classified as an "inter-tool" context shift. In contrast, moving from Windows to the SuperDuperIM installation program in the next step (i.e., the step "Execute the setup file downloaded during the previous task") is classified as a context shift of "Level 3 (cross-product)" since it involves moving across software products.

For the "new concepts" dimension this step is rated as "Level 1 (common concepts)". This step requires a general understanding of firewalls, malware, and using Windows Security Center. Since these concepts are not used anywhere in the preceding task of "Downloading SuperDuperIM" they are therefore classified as new concepts. Furthermore, these are considered "common concepts" because they are commonly used in other products used by the targeted user role and, therefore, are not concepts that are unique to SuperDuperIM. As a result, they meet the requirements of Level 1.

For the "input parameters" dimension this step is given a rating of 0 because the user does not need to provide any input parameters to complete the step.

For the "error feedback" dimension this step is rated as "Level 3 (complete documentation-based)." One of the error conditions associated with the user incorrectly turning off the firewall results in an error message that provides only an error code and brief description of the error but does not provide any recommendations for resolving the error. The user is forced to look up the error code in documentation to resolve the issue. Therefore, this step does not meet the requirements of "Level 1 (complete UI-based)" or "Level 2 (basic UI-based)," both of which require that the user interface clearly reports error conditions and provides helpful and complete recommendations on diagnosing and fixing problems in common situations. The documentation does, however, provide all the information required to diagnose and fix the problem in one module of information and therefore meets the requirements of Level 3.

For the "system feedback" dimension this step is rated as "Level 1 (easily-consumed feedback)". The actions of turning off firewalls and turning off malware protection both produce an automatic system response confirming these actions. Specifically, on/off indicators (coupled with green-light/red-light icons) signal that the firewalls and malware are on or off. In addition, the feedback has no extraneous information and all the feedback can be displayed in a maximized window. Furthermore, the system feedback happens immediately and therefore no progress information is required. In contrast, the step "Install program files" is rated as "Level 3 (difficult-to-consume feedback)" because the installation program does not provide progress information during the course of installation.

As discussed above with reference to FIG. 2, once the complexity of each step in the targeted tasks is rated (e.g., step 230) then complexity metrics are calculated for each step and for the user task (e.g., step 240). These metrics are calculated by mapping each rating into a corresponding complexity metric.

Each of the complexity dimensions may have a unique mapping between ratings and complexity metrics. FIG. 13 illustrates an exemplary mapping of ratings for the navigational guidance dimension into a complexity metric, and FIG. 14 illustrates an exemplary mapping of ratings for the system feedback dimension into a complexity metric.

In both FIGS. 13 and 14, at least part of the mappings between complexity ratings and complexity metrics use an exponential scale rather than a linear scale so as to increase complexity metrics at high-complexity levels. For example, as shown in FIG. 13, levels 1, 2, and 3 of the navigational guidance dimension map directly into complexity metric values of 1, 2, and 3. However, level 4 maps into a complexity metric value of 6, and level 5 maps into a complexity metric value of 9.

This exponential increase in complexity metrics at high-complexity levels may help in producing complexity metrics with a high correlation to empirical measures such as user time on task. Empirical user testing observations have shown that gaps such as undocumented concepts and task steps can result in very high increases in time on task, as will be discussed in greater detail below with reference to FIG. 16.

FIG. 15 shows an exemplary complexity metric for the user task "Installing and configuring SuperDuperIM on Windows Vista," which may be generated by applying mappings, similar to those shown in FIGS. 13 and 14, to the complexity ratings shown in FIG. 12. FIG. 15 shows the complexity metric for each complexity dimension of each step. For example, the navigational guidance complexity metric for the first step ("Turn off firewall and malware protection") is 6, indicated by reference numeral 1510.

FIG. 15 also shows the complexity metric for each step. For example, the first step ("Turn off firewall and malware protection") has a complexity metric of 15, shown in the rightmost column entry for that step and indicated by reference numeral 1520.

FIG. 15 also shows the complexity metric for each complexity dimension of the overall user task. For example, the navigational guidance complexity metric for the overall user task is 21 and is indicated by reference numeral 1530. The complexity metric for the overall user task is 79, as shown in the bottom-right entry of the table and indicated by reference numeral 1540.

The mappings between a complexity dimension's ratings and the corresponding complexity metrics are used to weight the relative influence of the complexity dimension on overall complexity. These weighted mappings have been developed through iterative refinement that targeted a close match between the complexity metric and empirical measures such as user time on task.

Figure 16:
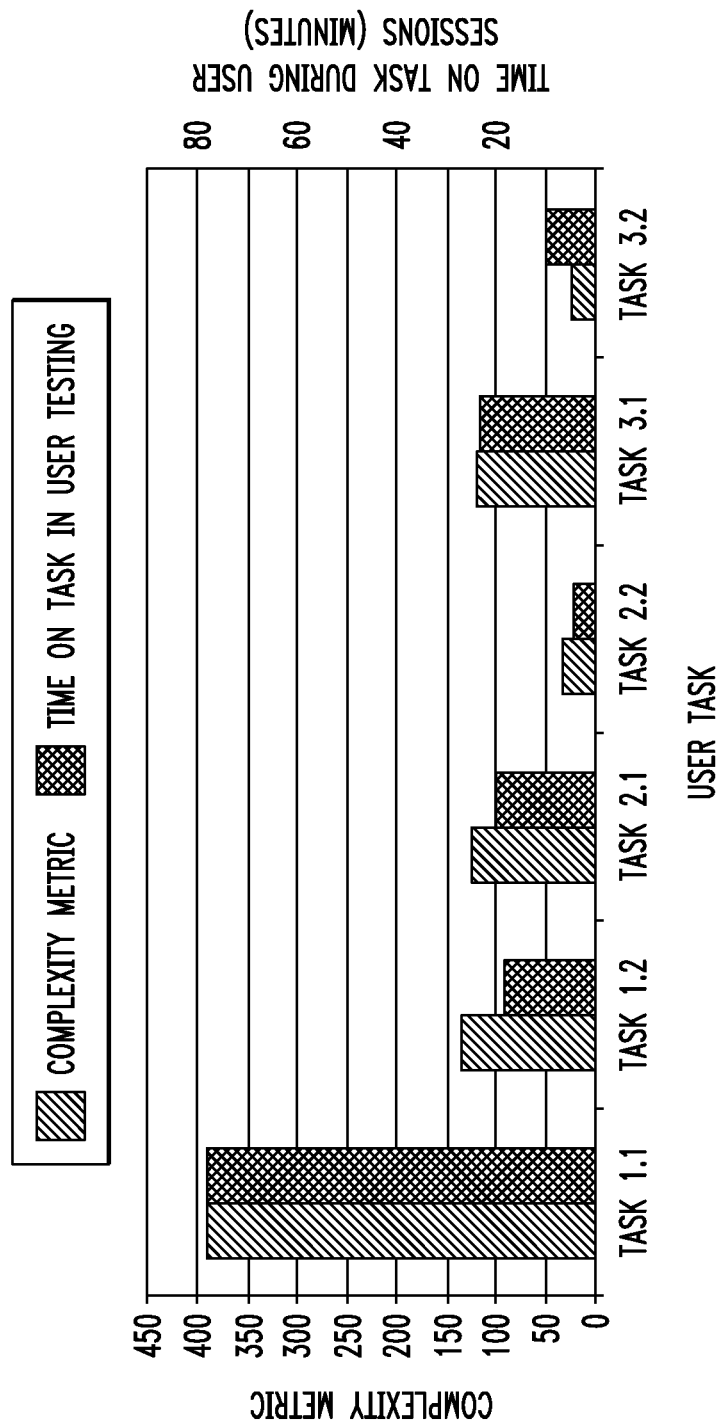
FIG. 16 shows experimental results comparing complexity metrics to time on task measured in user testing according to an embodiment of the invention.

FIG. 16 shows experimental results generated using an illustrative embodiment of the present invention. FIG. 16 shows a high statistical correlation (0.984) between the complexity metric and user time on task for a set of database configuration tasks. The lighter-shaded bars in FIG. 16 represent complexity metric values for 6 user tasks and the darker-shaded bars represent mean time on task as measured during usability testing for the same set of tasks. The sample size of the user testing was 6 test subjects.

Although a CUT analysis may be performed with only one evaluator, incorporating an additional evaluator will typically improve the objectivity and credibility of CUT analysis metrics. In one embodiment, a CUT analysis may be performed by at least one primary evaluator and at least one secondary evaluator. Preferably, both the primary evaluator and the secondary evaluator have been educated on applying the method for CUT analysis and both are familiar with the software system being analyzed. In one embodiment, the role of the primary evaluator is to lead the effort in applying the method for CUT analysis and leveraging the results in the software development team.

The role of the secondary evaluator may include reviewing the CUT analysis of the primary evaluator to check for basic errors and to ensure that the CUT analysis method is applied objectively and that the personal biases of the primary evaluator, be they intentional or unintentional, are minimized or eliminated in the analysis.

The degree of accuracy of the complexity metric could be further increased by having the secondary evaluator carry out an independent complexity analysis in parallel with the primary evaluator. After these independent analyses are completed then the two evaluators meet to review and combine their collective analyses. Combining these independent complexity analysis into a "best of both worlds" analysis have been found to be very effective in uncovering human errors and biases that may not be uncovered through a method where the secondary evaluator reviews the analysis of the primary evaluator. However, the latter method requires a smaller investment of human resources and yields complexity metrics that are typically within 10% of the combined analysis approach.

Choosing an appropriate evaluation approach may depend on the way in which the CUT analysis will be used. For example, for a software system undergoing agile development, the accuracy of a method in which the secondary evaluation merely reviews the CUT analysis performed by the first evaluator, or even a method in which only one evaluator is used, will often be sufficient to identify high-complexity steps that need to be improved in an upcoming agile iteration. For a fully-functional software system that is about to be released to market then it may be desirable to use the two-independent-analyses approach to derive metrics that can be used to communicate value propositions to prospective customers. In such situations where claims are being made in the marketplace then a higher degree of accuracy may be warranted.

Figure 17:
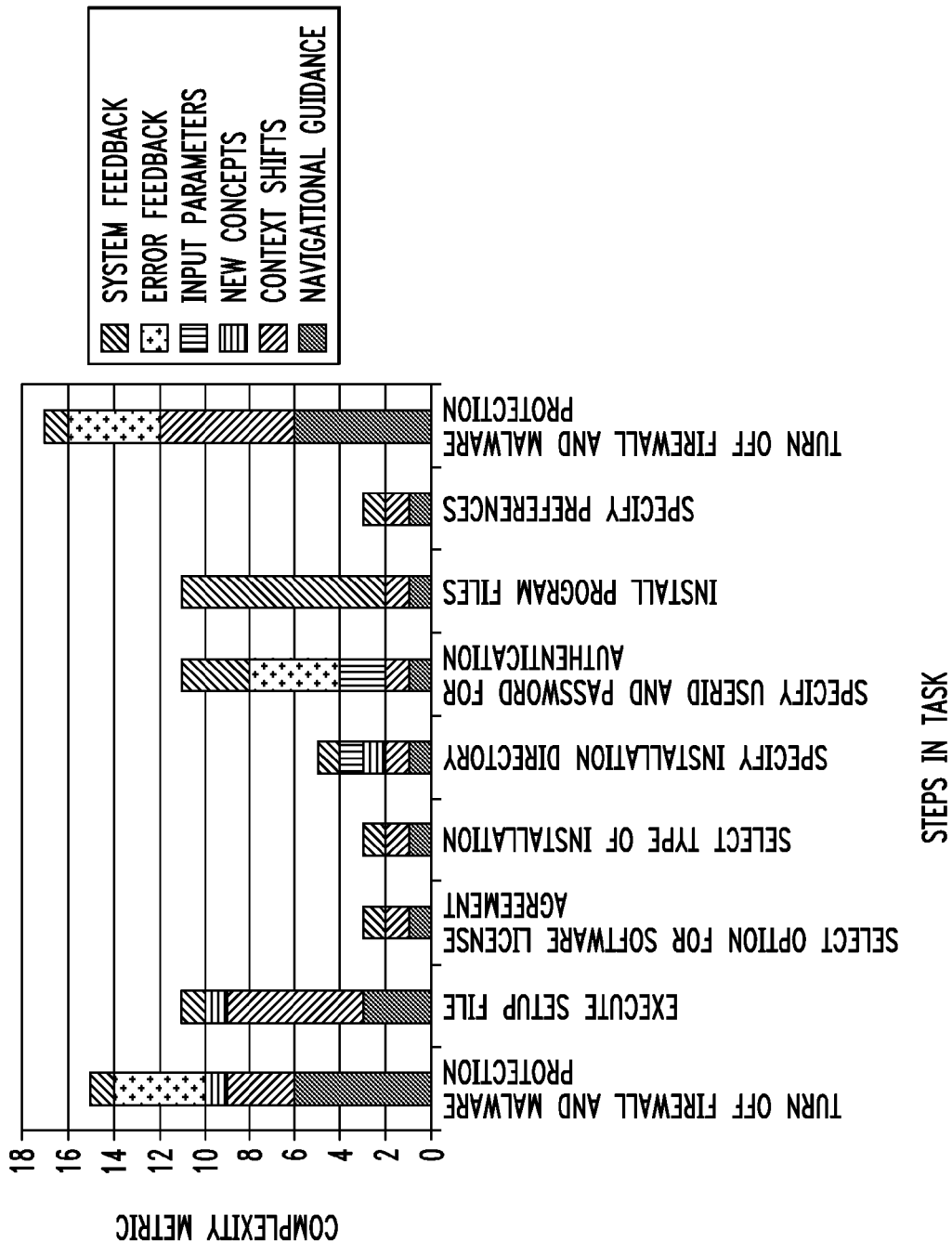
FIG. 17 shows an exemplary summary chart of complexity analysis results according to an embodiment of the invention.

Once the CUT analysis is complete then the complexity metrics can be used to identify and prioritize usability issues by drilling-down into complexity bottlenecks (see step 250 in FIG. 2). FIG. 17 shows an exemplary summary chart corresponding to the exemplary "Installing and configuring SuperDuperIM on Windows Vista" CUT analysis heretofore discussed. FIG. 17 visually illustrates that the most complex steps (in rank order) are: "Turn off firewall and malware protection" and "Turn on firewall and malware protection."

FIG. 17 also shows that navigational guidance and context shifts account for most of the complexity in these two steps, and therefore addressing these complexity dimensions should be considered a top priority for reducing the complexity of the overall task. For example, incorporating the two highest-complexity steps into the SuperDuperIM installation wizard (rather than requiring the user to carry out these steps through the Windows Security Center) would significantly reduce complexity metrics for both navigational guidance and context shifts. An even more dramatic improvement would involve automating these steps "under the covers" of the installation wizard so that the user is not even aware of them happening. Such improvements would not only reduce the complexity for these two steps but also reduce the context shifts complexity for the second step "Execute setup file."

The top usability issues can be identified and prioritized using this approach to drilling down into complexity issues. For example, FIG. 18 summarizes an exemplary list of the top 3 usability issues for "Installing and configuring SuperDuperIM on Windows Vista." More particularly, the "Priority ranking" column is a rank ordering of the severity of usability issues based on the complexity metrics, and the "Complexity impact" column shows the amount of the complexity metric that originates in each of these issues.

Also, recommendations are presented for addressing these issues. Specifically, in FIG. 18, at least two recommendations are presented for each issue: a "highest impact" recommendation and a "bare minimum improvement." For some issues, a third recommendation may be presented as a "next best alternative" to the "highest impact" recommendation. More generally, one or more recommendations may be presented for each issue, and the recommendations may be ranked in order from most impact to least impact on the complexity metric. The presentation may include a corresponding absolute and/or relative reduction in the complexity metric for the step and/or the overall task which would result from the implementation of each recommendation.

In FIG. 18, the highest-ranked usability issue is "poor navigational guidance and high context shifting for turning firewall off before installation, and then turning it back on after installation," which has a complexity impact of 35. As discussed above, for example, with reference to FIG. 15, these tasks involve the user navigating to the Windows Security Center before and after the installation. Furthermore, the user is informed about these steps in the installation procedure documentation but then needs to search for other documentation located in an appendix (and not linked to the installation procedure documentation) to find out how to perform them.

FIG. 18 also presents various recommendations for this usability issue, which include the solutions discussed above with reference to FIG. 17. Specifically, FIG. 18 indicates that the "highest impact" recommendation is to automate turning the firewall off and on in the installation program, which would reduce the complexity metric by 35 resulting in a 44% reduction in complexity for the task. As discussed above with reference to FIG. 17, this recommendation would not only reduce the complexity for these two steps but also reduce the context shifts complexity for the second step "Execute setup file."

The "next best alternative" recommendation is to incorporate the two firewall-related steps into the installation wizard, which can potentially reduce the complexity metric by 28 resulting in a 35% reduction in complexity for the task. The "bare minimum improvement" would be to add task-oriented documentation for the firewall steps directly into the installation wizard, which can potentially reduce the complexity metric by 6 resulting in an 8% reduction in complexity for the task.

The second highest-ranked usability issue shown in FIG. 18 is that there is no progress indication during installation of program files, which results in poor system feedback to users about the state of the installation process. As discussed above with reference to FIG. 12, because the installation program does not provide progress information during the course of installation, the step "Install program files" was rated as "Level 3 (difficult-to-consume feedback)" for system feedback.

As shown in FIG. 15, this Level 3 ranking for system feedback was mapped to a complexity metric of 9, in accordance with the mapping shown in FIG. 14. By contrast, had this task been assigned a Level 1 ranking for system feedback (the lowest ranking available to an action step for this complexity dimension, as discussed above with reference to FIG. 11), the corresponding complexity metric would have been 1, as shown in FIG. 14. Thus, the complexity impact for this poor system feedback is 8, as shown in FIG. 18.

FIG. 18 states that the "highest impact" recommendation would be to provide a progress indication that shows estimation of time remaining that is updated every 2 seconds and that gradually increases in accuracy. As discussed above with reference to FIG. 12, this would cause the "Install program files" to be assigned a system feedback rating of Level 1 rather than Level 3. As shown in FIG. 14, this would reduce the associated complexity metric from 9 to 1. As shown in FIG. 18, this reduction in the complexity metric by 8 would result in a 10% reduction in the task complexity, which is currently 79.

The "bare minimum improvement" shown in FIG. 18 would be to provide a progress indication that shows the stage of installation currently under way. As discussed above with reference to FIG. 12, this would cause the "Install program files" to be assigned a system feedback rating of Level 2 rather than Level 3. As shown in FIG. 14, this would reduce the associated complexity metric from 9 to 3. As shown in FIG. 18, this reduction in the complexity metric by 6 would result in a 8% reduction in the task complexity, which is currently 79.

Complexity metrics can also be used to report on the usability outlook during the course of development. The current release under development may have usability objectives that call for better (i.e., lower) complexity metrics for targeted tasks relative to the current release in the marketplace or relative to the key competition.

Figure 19:
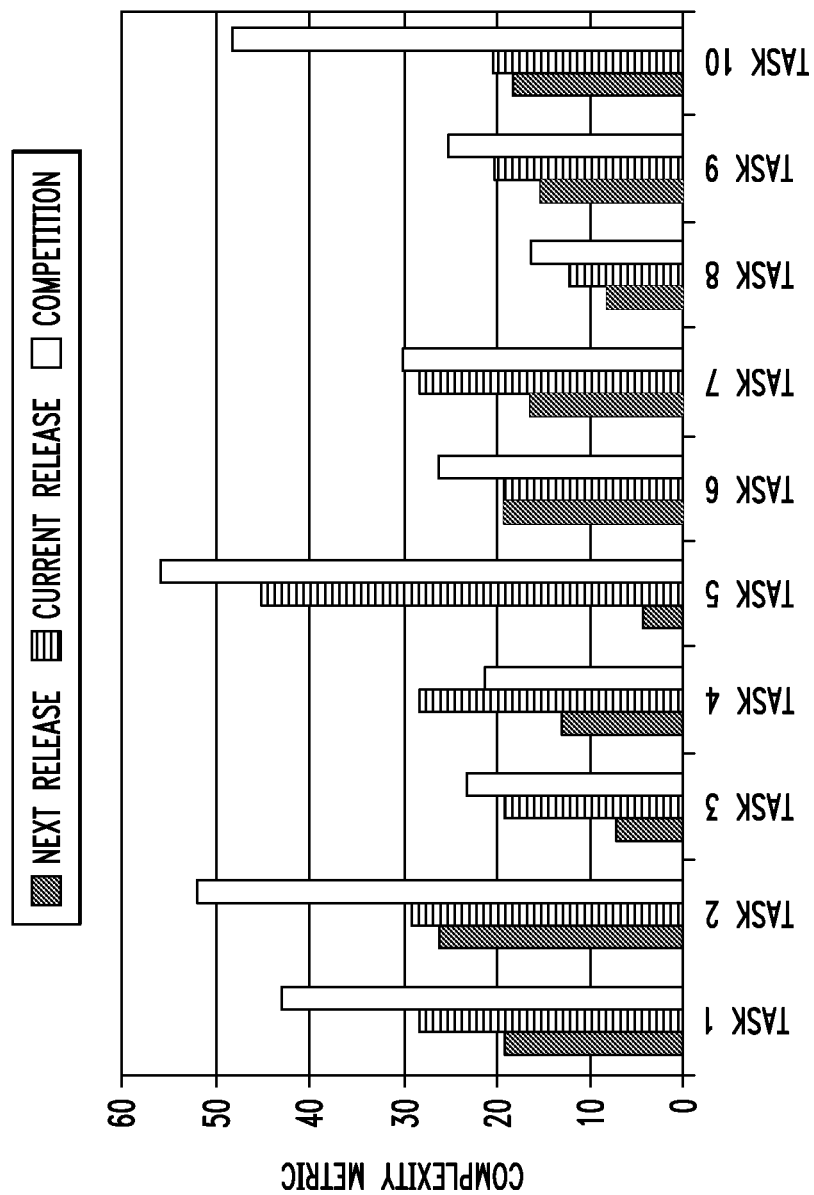
FIG. 19 shows an exemplary complexity dashboard according to an embodiment of the invention.

FIG. 19 shows an exemplary chart referred to as a "complexity dashboard," which facilitates tracking of usability objectives using complexity metrics through a chart. Specifically, FIG. 19 shows the complexity metrics associated with 10 targeted user tasks in the next release of a software system (the darker-shaded bars), in a current release of that software system (the bars with horizontal stripes), and in a competitor's software system (the lighter-shaded bars).

In an embodiment where an iterative or incremental software development methodology, such as agile software development, is employed, the complexity metrics in FIG. 19 could be revised after each iteration throughout development to reflect the latest outlook and then reported to software development managers and other stakeholders to provide an outlook for how the release is trending. If any tasks are trending not to achieve the usability objectives then corrective action plans can be triggered.

After a software development project is completed and the software is released, these complexity metrics can be used to communicate a value proposition to potential users of the software in terms that are meaningful to them. In the case of a software product, such value propositions can be communicated through marketing channels and can potentially influence purchase decisions.

For example, assume the complexity metrics in FIG. 19 represent the final complexity metrics for the next release of a database product that has just completed development. Furthermore, assume that the 10 tasks in FIG. 19 are the 10 most important database administration tasks as determined through surveys of database administrators. The total of the complexity metrics for tasks 1 to 10 for the next release (shown by the darker-shaded bars) in FIG. 19 is 57% lower than the corresponding complexity metrics for the competition (shown by the lighter-shaded bars). Thus, the value proposition to potential customers could be as follows: "Our new release allows your staff to complete the top 10 database administration tasks in 57% less time than with the competition, resulting in significantly lower cost of ownership for your organization."

An illustrative technique for performing step 250 of the CUT analysis shown in FIG. 2 is further described in the following sections on ACUE. Although ACUE is described with reference to an agile software development project, illustrative embodiments of the present invention may be applicable to other iterative and/or incremental development methodologies.

As heretofore discussed, CUT analysis is an effective method for usability evaluation because of the close match between its complexity metrics and the empirical measures gathered through usability testing, and because CUT analysis is a relatively "lightweight" method from a human resources perspective. ACUE (Agile CUT-based Usability Engineering) is a method for applying usability engineering throughout the lifecycle of an agile software development project in a low-cost and high-impact manner through the use of CUT analysis.

In an illustrative embodiment, software development roles may be distributed amongst the team of people working on the project. As heretofore discussed, the team may include a primary evaluator and a secondary evaluator, both of whom have been educated on applying the method for CUT analysis and are familiar with the type of software system under development. The primary evaluator may lead the effort in applying the method for CUT analysis and leveraging the results in the software development team. The secondary evaluator could review the CUT analyses of the primary evaluator to check for basic errors, ensure that the CUT analysis method is applied objectively, and ensure that the intentional or unintentional personal biases of the primary evaluator are minimized or eliminated in the analysis.

The team may include a usability architect responsible for ensuring the ease of use of the software system under development for targeted user roles. The team could also include a software development lead responsible for leading the team of software developers that will design, code, and test the software. The team could also include an information development lead responsible for the information deliverables (e.g., online help, embedded assistance in the user interface, hardcopy manuals) associated with the software system.

The team could further include a project executive with overall responsibility for development of the software system and its success after release. The team could also include a product manager responsible for determining the content of the software system under development (e.g., functional content, usability characteristics), and ensuring that this content meets the needs of the customers/clients of the software system.

There may be several people assigned to each of these roles and one person may take on more than one of the above roles. For example, the usability architect or information development lead often takes on the role of the primary or secondary evaluator. There may be several layers of management roles rather than a single project executive role.

One skilled in the art will understand that, although illustrative embodiments may associate certain steps of an ACUE process with one or more of the roles enumerated therein, these steps may be performed by any member of a development team, or even by other individuals, such as an outside consultant or an independent developer.

FIG. 20 shows an illustrative flowchart for implementing an ACUE process according to an illustrative embodiment. The exemplary process shown in FIG. 20 may span the lifecycle of an agile software development project, or it may be implemented over a longer or shorter timeframe.

Step 2010 includes defining quantified usability objectives and iteratively refining these objectives based on project constraints. These usability objectives are used to characterize the desired state of the software system from a usability perspective by identifying explicit and measurable success factors such as "Decrease time spent on key security administration tasks by 50% relative to the currently-available release for the 'occasional security administrator' user role." Such objectives may be used to improve usability and track the project throughout the iterative development process (described herein with reference to step 2020) and communicate value propositions to customers and/or clients after development is complete (described herein with reference to step 2030).

Step 2020 includes an iterative software development process. Preferably, CUT analysis is executed during each agile iteration in order to drive plans for decreasing newly-found sources of high complexity and provide regular updates to upper management on progress towards achieving the usability objectives. CUT analysis can begin as early as a first agile iteration before any software is coded or prototyped but at the point where an initial representation of at least some of the software externals are available. Afterwards, the CUT analysis may be updated repeatedly to reflect the evolving usability outlook throughout the agile development process. In an illustrative embodiment, these analyses are produced frequently and with low cost to development team resources.

Step 2030 includes creating customer/client value propositions. A final CUT analysis may be carried out after development is completed in order to produce complexity metrics that communicate value propositions to potential users of the software in terms that are meaningful to them. An example of such a value proposition is "Our new release allows your staff to complete the 10 most important database administration tasks in 57% less time than with the competition, resulting in significantly lower cost of ownership for your organization."

At the outset of a software development project it is common for budgets and resources to be allocated, objectives/goals of the project to be defined, and project plans and schedules to be produced. These up-front "project parameters" are typically revisited several times during the course of a development project but there is usually some initial formulation of them (even if not formally documented) prior to a significant amount of development resource being expended. From a usability engineering perspective, these project parameters translate into defining usability objectives and associated plans for achieving those objectives. These objectives are used to characterize the desired state of the software system from a usability perspective by identifying explicit and measurable success factors. They are used to forge plans, influence and track the project throughout development, and communicate value propositions to customers and/or clients after development is complete.

As heretofore discussed, step 2010 involves defining quantified usability objectives and associated plans. However, step 2010 may itself comprise a series of steps. In step 2011, the product manager identifies the benchmark software system and the targeted user roles. The benchmark software system could be a previous release of the software under development, a competitive offering, or another software system used by the targeted user roles. In addition, the product manager identifies the targeted tasks that will be analyzed for the benchmark software system.

In step 2012, the primary and secondary evaluators carry out the method of CUT analysis for the benchmark software system to establish a usability baseline for the software system under development. This CUT analysis may be similar to that described above with reference to FIG. 2, including: defining the sequencing and steps of the targeted user tasks; rating the complexity of each step in the targeted user tasks; and calculating the complexity metrics for these tasks. The relatively lightweight nature of CUT analysis preferably allows for a quick turnaround for producing this usability baseline.

In step 2013, the product manager and usability architect may use the usability baseline to define proposed usability objectives. These proposed usability objectives may take any number of forms, as discussed above with reference to step 210 in FIG. 2.

In step 2014, the proposed usability objectives and associated usability baseline may be reviewed by the software development lead, information development lead, project manager, and project executive in order to evaluate the feasibility of forging a project plan that achieves these objectives. This feasibility takes into account the constraints of the release date, available resources, and skills profile of people available to work on this project.

For example, the usability objective for a project is to reduce the complexity for a set of tasks by 50% relative to a currently-available release. Furthermore, most of the existing complexity is due to lack of documentation for navigational guidance, new concepts, and error feedback. As a result the information development lead investigates which documentation improvements would be required to make a 50% improvement, and whether these improvements could be contained given the release date and resources/skills available in the information development team.

In step 2015, the product manager and usability architect revise the usability objectives based on feedback from the previous step 2014. These two process steps of reviewing objectives 2014 and refining objectives 2015 may be iteratively carried out until the project executive is satisfied that an achievable set of usability objectives are in place. The project executive may need to modify the project parameters (such as release date) in order to come to closure on this iteration. Once this closure is achieved then project plans are updated to reflect the activities required to achieve the usability objectives.

In the spirit of agile software development, some or all of the above steps may be revisited during subsequent stages as a better understanding of the domain of the software system under development emerges.

The quantified usability objectives resulting from step 2010 can take the form of the "complexity dashboard" shown in FIG. 18. The tasks listed on the x-axis may represent the targeted tasks identified by the product manager in step 2011. The y-axis may provide a measure of the complexity metric value arising from the baseline CUT analysis of the benchmark software system (specifically, the current release or the competition) in step 2012 above, as well as the targeted complexity metrics for the next release of the software system under development (as initially set in step 2013 and refined in steps 2014 and 2015).

Depending on the baseline chosen for the project, the complexity dashboard would include a subset of the bars in this figure. For example, the usability objectives may include the bars with horizontal stripes representing the current release but not the lighter-shaded bars representing the competition if the usability objectives are not focused on the competition. The complexity metrics in this chart can be used to communicate the usability objectives at the outset of the project, and then they can be revised after each agile iteration throughout the development process to reflect the latest outlook.

Once the iterative agile development process gets under way, ACUE may be integrated into each of the agile iterations in step 2020. Step 2020 preferably involves rapid generation of complexity metrics at relatively low cost to the development team. Step 2020 preferably includes a series of steps which may be iterative repeated.

In step 2021, the primary and secondary evaluators execute the method of CUT analysis (e.g., steps 220 through 240 in FIG. 2) to calculate the most current understanding of the software system's complexity for the targeted user tasks. In addition, the evaluators may refine the steps in user tasks based on the additional clarity obtained during the course of the iteration. For example, an iteration may result in the elimination of a step in a user task due to simplification of the software system's user interface, and therefore the steps in the complexity analysis are updated to reflect the elimination of this step. This updating the CUT analysis may be carried out before the end of each iteration.

In step 2022, the primary evaluator analyzes new information stemming from the CUT analysis, particularly sources of increased complexity. (This corresponds to step 250 in FIG. 2) Step 2022 may include identifying new steps added to tasks and existing steps that have significantly higher complexity than they had previously. Step 2022 can also include comparing task-level complexity to the targeted usability objectives. This evaluation may be completed before the end of each iteration.

In step 2023, the primary evaluator reviews the updated complexity analysis with the usability architect, product manager, software development lead, and information development lead. They, in turn, identify plans for addressing sources of increased complexity. These plans may involve reallocating resources, revisiting user interface designs, revisiting usability objectives, and identifying focus areas for the upcoming iteration. These plans may be formulated at the start of the following iteration and involve the usability architect, software development lead, and information development lead.

In step 2024, the usability architect (along with the product manager, software development lead, and information development lead) report on the updated "complexity dashboard" to the project executive, along with the plans for addressing sources of increased complexity. Experience has shown that complexity dashboards provide executives with an effective, easy-to-understand snapshot of how the usability for the release under development is trending. During step 2024, the plans for addressing sources of increased complexity are refined as necessary based on feedback from the project executive and these plans are then used in formulating the objectives of the next iteration.

Step 2020 can begin with the very first agile iteration, before any software is coded or prototyped but at the point where an initial representation of at least some of the software externals are available. This representation can be in the form of a formal written specification or an informal design direction that can be articulated by someone on the development team (for example, the software development lead or the usability architect). Relative to the subsequent stages of development, this stage has the most opportunity to address a wide range of usability issues identified through CUT analysis because more remaining development time and resources are available and less code rework is required to address usability issues since code implementation has not yet begun.

In this early stage of development CUT analysis would be performed to the extent possible. All the steps of the targeted user tasks would not likely be known up front but what is known would be recorded and subjected to CUT analysis to provide a preliminary view of complexity metrics. At this stage, the impact of major issues could potentially be identified and brought forward to project leaders for review.

An example of applying CUT analysis during the course of an iteration is the case where the objective of a three-week iteration may be to develop a SuperDuperIM installation component that installs program files. No graphical interface for gathering user input for the installation program would be developed for this iteration; only the code for copying program files to disk would be developed. As part of this iteration it would be feasible to evaluate the complexity dimensions for one of the steps in the installation, specifically "Install program files," based on working code. As a result, this iteration can flag issues such as the system feedback complexity metric for this step receiving a complexity metric of 9 (which is a high value) due to lack of progress indication during the copying of program files. Consequently, the CUT analysis at the end of the iteration would show a relatively high value for system feedback for this step.

Various actions could be taken during the next iteration in response to this analysis. For example, it be may be desirable to add progress indication as part of a subsequent iteration; perhaps progress indication was simply overlooked or discounted too much earlier in the project and needs to be addressed. It may be desirable to instead take no action to address the system feedback issue; perhaps lack of progress indication is a known trade-off that was made at the beginning of the project due to resource constraints and the team is confident that the overall task will still achieve its objectives.

Each agile iteration would refine the CUT analysis as per the preceding example. Any changes to the CUT analysis that stem from new information revealed during the iteration can quickly be made in a matter of minutes. Note that although CUT analysis is performed for each agile iteration, evaluators only need to update the previous iteration's CUT analysis based on new information emerging during the current iteration. The evaluators do not need to perform a new CUT analysis from scratch during each iteration, thus contributing to the low-resource-cost nature of ACUE.

From a tooling perspective, ACUE is made more efficient through standardized spreadsheet templates that capture each iteration's CUT analysis and that track iterations through the overall development process.

Although complexity analysis can provide quick-turn-around data on usability for each iteration, it may nevertheless be desirable to also gather usability testing feedback periodically to complement CUT analysis. Although there is a close match between usability testing results and CUT analysis, there are unique insights that can be derived from usability testing, particularly for low-level graphical user interface interactions related to widget layout and affordance. Therefore, an agile team may choose to perform usability testing on its working software once every 3 or 4 iterations, depending on project constraints and timelines.

Agile software development emphasizes the need to continuously and frequently deliver working software that can be evaluated by stakeholders. This stakeholder feedback can also be a complement to CUT analysis in the same way as usability testing. There are some aspects of stakeholder feedback that can provide insights that are outside the scope of CUT analysis, particularly in the area of validating evolving requirements. Such feedback can be particularly useful in prompting development teams to revisit their usability objectives on a regular basis.

After a software development project is completed and the software is released. complexity metrics can be used to communicate a value proposition to potential customers and/or clients in terms that are meaningful to them, corresponding to step 2030. In the case of a software product, such value propositions can be communicated through marketing channels and can potentially influence purchase decisions.

For example, assume the complexity metrics in FIG. 19 represent the final complexity metrics for the next release of a database product that has just completed development, and that these tasks form a sequential workflow ordering for the 10 most important administration tasks. The total of the complexity metrics for tasks 1 to 10 in FIG. 19 is 57% lower than the corresponding complexity metrics for the competition. In this case, a key value proposition to potential customers could be as follows: "Our new release allows your staff to complete a sequence of the 10 most important database administration tasks in 57% less time than with the competition, resulting in significantly lower cost of ownership for your organization."

In an exemplary embodiment, step 2030 may be implemented as a series of steps. In step 2031, the final "complexity dashboard" for the software system is produced by having two independent complexity analyses carried out: one by the primary evaluator and another by the secondary evaluator and/or product manager. These independent analyses are then combined by these evaluators into a "best of both worlds" analysis. This typically results in a higher degree of accuracy than would be the case with a method in which a primary evaluator carries out an evaluation and then the secondary evaluator merely reviews the work of the primary evaluator.

Note that during the course of an agile iteration the accuracy of the latter method will typically be sufficient to identify high-complexity steps that need to be improved in an upcoming agile iteration. However, for a fully-functional software system that is about to be released to market, it may be desirable to use the two-independent-analyses approach to derive metrics that can be used to communicate value propositions to prospective customers. In such situations, where claims are being made in the marketplace, a higher degree of accuracy may be desired.

In step 2032. supporting materials that "tell the story" behind the complexity dashboard are assembled by the product manager. For example, tasks that are significantly less complex than the corresponding tasks for competitive products are illustrated in detail through screen shots or descriptions of task automation.

In step 2033, the complexity dashboard, along with the supporting materials. are then combined by the product manager into marketing materials such as presentations, white papers, or marketing websites. Note that a CUT analysis will provide in-depth drill-down capabilities to tell the whole story behind the complexity dashboard.

In an illustrative embodiment, leveraging CUT analysis over usability inspection methods for such marketing purposes advantageously provides a quantifiable, objective basis for its results, as described earlier. Further benefits of an illustrative embodiment of CUT analysis over usability testing results for marketing purposes include speed of execution and transparency.

With regard to transparency, CUT analysis results can be published along with the associated rating scales and mappings used for the analysis. Potential customers can then review the results and the underlying scales and/or mappings and see exactly how the metrics are derived. In contrast, publishing usability testing results is less transparent; potential customers need to accept published usability testing metrics such as time on task and user satisfaction as a matter of trust. Furthermore, the degree to which prospective customers are willing to accept that usability test results report exactly what transpired during the testing and that the testing conditions generated truly objective data can be quite variable.

CUT analysis shares the lightweight characteristics of usability inspection methods and, therefore, can provide quick-turnaround feedback during the course of an agile iteration. However, CUT analysis offers several benefits over usability inspection methods. For example, CUT analysis generates metrics that provide an overall measure of usability and that quantify the impact of individual usability issues.

CUT analysis metrics are based on criteria that are more objective than the equivalent elements of usability inspection methods (such as the heuristic rules of heuristic evaluation). CUT analysis leaves much less to human judgment and, instead, provides a concrete, highly detailed set of rules for generating metrics. As a result, CUT analysis provides a more objective approach to identifying and prioritizing usability issues by software development teams.

CUT analysis metrics have a high correlation to usability testing time-on-task measures (a key indicator of usability), and thus provide insight into relative time-on-task comparisons across user tasks. Usability inspection methods do not provide this level of insight into time-on-task measures.

CUT analysis generates high-level metrics that can be used to communicate value propositions to potential users of the software in terms that are meaningful to the users. In the case of a software product, such value propositions can be communicated through marketing channels and can potentially influence purchase decisions. In contrast, usability inspection methods do not produce such high-level metrics and don't have a significant role in communicating value propositions.

CUT analysis is applicable to a wide range of software user tasks and to a wide range of user types such as home computer users, web content developers, and database administrators. More generally, CUT analysis is applicable for both experienced and inexperienced users.

CUT analysis is an effective method for usability evaluation because of the close match between its complexity metrics and the empirical measures gathered through usability testing, and because CUT analysis is a relatively "lightweight" method from a human resources perspective.

Illustrative embodiments of ACUE provide the benefits to various stakeholders in the development of the software system. For interdisciplinary development teams, ACUE can provide a quick way of identifying and prioritizing usability issues during the course of an agile iteration.

For project managers and development executives, ACUE can provide a visual, easy-to-understand depiction of usability engineering results that provide a snapshot of how the usability for the release under development is trending. These results can be updated and generated frequently at relatively low resource cost at the end of each agile iteration.

For customers and clients of the software being developed, ACUE may provide a means of quickly understanding value propostitions related to usability and cost of ownership.

Illustrative embodiments of the ACUE process described herein provide a number of advantages over current usability engineering practices. For example, ACUE may provide a lower cost (from a resource perspective) and may be faster to implement than methods that rely on usability testing. This is a key advantage given that agile software development projects are characterized by short-timeframe iterations and by rapid adaptation of designs in response to changing circumstances.

ACUE may also provide more objective and reliable data than methods that rely on usability inspection methods. This advantage reduces the subjectivity associated with identifying and addressing usability issues, thus enabling teams to agree and act upon these issues more quickly and effectively.

CUT analysis and ACUE may enhance the ability of agile software development teams to quickly identify and address top-priority usability issues. The speed of execution of CUT analysis and ACUE can be further improved through a CUT-based Usability Evaluation Tool (UET) which automates the generation of guidance and recommendations about how to improve the usability of a software system under evaluation.

A UET requires that a usability evaluator executes a user task with the software system under development (for example, using a driver stemming from an agile iteration). The UET monitors the user interface and determines whether any requirements for low-complexity scores are breached as the evaluator executes the task. If some of these requirements are not met then UET flags the condition that caused the failure and provides recommendations on how to improve usability.

In an illustrative embodiment, an evaluator of the SuperDuperIM system described earlier starts a UET and then proceeds to perform the task "Installing and configuring SuperDuperIM on Windows Vista."

When the evaluator initiates the step "Install program files" then the SuperDuperIM installation program issues a progress indicator. However, this progress indicator stays in one of its states for longer than 20% of the overall time required to complete the operation. As a result, the level 1 system feedback requirement is breached.

The UET, which monitors state changes in the user interface and detects this breach, logs the breach in a report (which the evaluator can choose to view interactively as the task is being performed).

After completing the task the evaluator reviews the UET report which provides a list of all breaches to requirements for low-complexity scores. In addition, the report lists the associated level definitions that are breached and recommendations for how to address these issues (for example, "increase the level of granularity for progress feedback to be less than 20% of the overall operation").

Although an exemplary UET may not flag all breaches of complexity metric requirements, some of which may require human judgment, the use of a UET can automate detection of breaches for several requirements, thereby simplifying the CUT analysis process for evaluators.

The techniques as heretofore described can also include, as described herein, providing a system, wherein the system includes distinct software modules (for example, a UET module and/or a user interface module executing on a hardware processor), each of the distinct software modules being embodied on a tangible computer-readable recordable storage medium.

Additionally, the techniques as heretofore described can be implemented via a computer program product that can include computer usable program code that is stored in a computer readable storage medium in a data processing system, and wherein the computer usable program code was downloaded over a network from a remote data processing system. Also, in one or more embodiments of the invention, the computer program product can include computer usable program code that is stored in a computer readable storage medium in a server data processing system, and wherein the computer usable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 21:
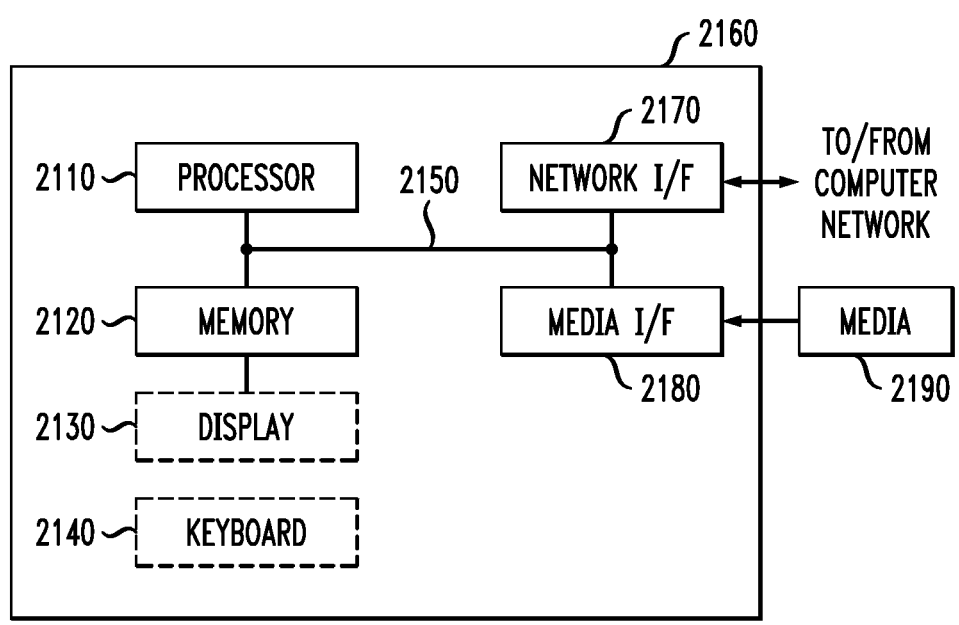
FIG. 21 shows a computer system that may be useful in implementing one or more aspects and/or elements of the invention.

One or more embodiments can make use of software running on a general purpose computer or workstation. With reference to FIG. 21, such an implementation employs, for example, a processor 2110, a memory 2120, and an input/output interface formed, for example, by a display 2130 and a keyboard 2140. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 2110, memory 2120, and input/output interface such as display 2130 and keyboard 2140 can be interconnected, for example, via bus 2150 as part of a data processing unit 2160. Suitable interconnections, for example via bus 2150, can also be provided to a network interface 2170, such as a network card, which can be provided to interface with a computer network, and to a media interface 2180, such as a diskette or CD-ROM drive, which can be provided to interface with media 2190.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 2190) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 2120), magnetic tape, a removable computer diskette (for example media 2190), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code can include at least one processor 2110 coupled directly or indirectly to memory elements 2120 through a system bus 2150. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 2140, display 2130, pointing device, and the like) can be coupled to the system either directly (such as via bus 2150) or through intervening I/O controllers (omitted for clarity).

Network adapters such as network interface 2170 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 2160 as shown in FIG. 21) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for reducing complexity of at least one user task, comprising the steps of:
    capturing user interaction data corresponding to a user interacting with one or more graphical user interfaces of a software program while the user performs at least one software task, wherein the at least one software task comprises a plurality of steps performed by the user;
    analyzing the captured user interaction data to generate a set of data representative of the user interaction with the software program when performing the at least one software task;
    processing the set of data to determine an overall complexity metric for the at least one software task, wherein the overall complexity metric for the at least one software task is determined based on a plurality of complexity metrics associated with respective ones of the plurality of steps of the at least one software task;
    processing the plurality of complexity metrics to identify one or more usability issues having a measurable impact on the overall complexity metric for the at least one software task, wherein the one or more usability issues comprise one or more issues associated with the user performing the at least one software task;
    determining a ranking of the one or more usability issues based on the impact of the one or more usability issues on the overall complexity metric, wherein at least one of the one or more usability issues is determined based at least in part on the ranking;
    determining one or more recommendations for addressing at least one of the one or more usability issues;
    displaying a representation of at least one of the one or more usability issues in a ranked order according to the determined ranking of the one or more usability issues, together with a representation of at least one of the one or more recommendations which address the usability issues that are displayed in ranked order; and
    modifying one or more of the plurality of steps of the at least one software task based on at least one of the one or more identified usability issues and associated determined recommendations to improve usability of the software program,
    wherein the capturing, analyzing, processing, determining, displaying, and modifying steps are executed on a computing system comprising a processor and a memory, wherein one or more software modules for implementing the capturing, analyzing, processing, determining and displaying steps are loaded from the memory and executed by the processor.

2. The method of claim 1, wherein implementing any one of the one or more recommendations reduces the impact of the usability issue on the overall complexity metric of the at least one software task and thereby reduces a complexity of the at least one software task.

3. The method of claim 1, wherein the overall complexity metric for the at least one software task is determined based on the plurality of complexity metrics which are associated with respective complexity dimensions associated with the at least one software task.

4. The method of claim 3, wherein a given one of the one or more usability issues is associated with at least a given one of the complexity dimensions associated with the at least one software task.

5. The method of claim 1, wherein a given one of the one or more usability issues is associated with at least a given one of the plurality of steps of the at least one software task.

6. The method of claim 1, wherein the at least one software task is selected based on at least one of a user role and a usability objective.

7. The method of claim 1, wherein determining one or more recommendations further comprises calculating an amount by which at least one of the one or more recommendations will reduce the impact of the usability issue on the overall complexity metric of the at least one software task.

8. The method of claim 7, further comprising the step of determining a ranking of at least one of the one or more recommendations based on the amount by which the at least one of the one or more recommendations will reduce the impact of the usability issue on the overall complexity metric of the at least one software task.

9. The method of claim 1, wherein modifying one or more of the plurality of steps of the at least one software task comprises implementing at least a given one of the one or more recommendations.

10. The method of claim 1, further comprising repeating the processing, determining and displaying steps subsequent to the modifying step.

11. The method of claim 1, wherein the processing, determining, displaying and modifying steps are repeated for one or more iterations of an iterative development process.

12. An apparatus for reducing complexity of at least one user task, comprising:
   at least one processor;
   and at least one memory coupled to the at least one processor to store program instructions;
   wherein the at least one processor is operative to execute the stored program instructions to perform the steps of:
      capturing user interaction data corresponding to a user interacting with one or more graphical user interfaces of a software program while the user performs at least one software task, wherein the at least one software task comprises a plurality of steps performed by the user;
      analyzing the captured user interaction data to generate a set of data representative of the user interaction with the software program when performing the at least one user task;
      processing the set of data to determine an overall complexity metric for the at least one software task, wherein the overall complexity metric for the at least one software task is determined based on a plurality of complexity metrics associated with respective ones of the plurality of steps of the at least one software task;
      processing the plurality of complexity metrics to identify one or more usability issues having a measurable impact on the overall complexity metric for the at least one software task, wherein the one or more usability issues comprise one or more issues associated with the user performing and the at least one software task;
      determining a ranking of the one or more usability issues based on the impact of the one or more usability issues on the overall complexity metric; wherein at least one of the one or more usability issues is determined based at least in part on the ranking;
      determining one or more recommendations for addressing at least one of the one or more usability issues;
      displaying a representation of at least one of the one or more usability issues in a ranked order according to the determined ranking of the one or more usability issues, together with a representation of at least one of the one or more recommendations which address the usability issues that are displayed in ranked order; and
      modifying one or more of the plurality of steps of the at least one software task based on at least one of the one or more identified usability issues and associated determined recommendations to improve usability of the software program.

13. The apparatus of claim 12, wherein implementing any one of the one or more recommendations reduces the impact of the usability issue on the overall complexity metric of the at least one software task and thereby reduces a complexity of the at least one software task.

14. An article of manufacture comprising a non-transitory storage medium having program code stored thereon, wherein the program code is executable by one or more processors to perform method steps for reducing complexity of at least one user task, the method steps comprising:
   capturing user interaction data corresponding to a user interacting with one or more graphical user interfaces of a software program while the user performs at least one software task, wherein the at least one software task comprises a plurality of steps performed by the user;
   analyzing the captured user interaction data to generate a set of data representative of the user interaction with the software program when performing the at least one software task;
   processing the set of data to determine an overall complexity metric for the at least one software task, wherein the overall complexity metric for the at least one software task is determined based on a plurality of complexity metrics associated with respective ones of the plurality of steps of the at least one software task;
   processing the plurality of complexity metrics to identify one or more usability issues having a measurable impact on the overall complexity metric for the at least one software task, wherein the one or more usability issues comprise one or more issues associated with the user performing the at least one software task;
   determining a ranking of the one or more usability issues based on the impact of the one or more usability issues on the overall complexity metric, wherein at least one of the one or more usability issues is determined based at least in part on the ranking;
   determining one or more recommendations for addressing at least one of the one or more usability issues;
   displaying a representation of at least one of the one or more usability issues in a ranked order according to the determined ranking of the one or more usability issues, together with a representation of at least one of the one or more recommendations which address the usability issues that are displayed in ranked order; and
   modifying one or more of the plurality of steps of the at least one software task based on at least one of the one or more identified usability issues and associated determined recommendations to improve usability of the software program.

15. The article of manufacture of claim 14, wherein implementing any one of the one or more recommendations reduces the impact of the usability issue on the overall complexity metric of the at least one software task and thereby reduces a complexity of the at least one software task.

* * * * *